(12) United States Patent
Crosby et al.

(10) Patent No.: US 9,759,370 B2
(45) Date of Patent: *Sep. 12, 2017

(54) DEVICES FOR APPLICATION AND LOAD BEARING AND METHOD OF USING THE SAME

(71) Applicant: University of Massachusetts, Boston, MA (US)

(72) Inventors: Alfred J. Crosby, Amherst, MA (US); Michael D. Bartlett, Amherst, MA (US); Duncan J. Irschick, Amherst, MA (US); Daniel R. King, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,324

(22) Filed: Oct. 14, 2015

(65) Prior Publication Data

US 2016/0102804 A1    Apr. 14, 2016

Related U.S. Application Data

(63) Continuation of application No. 14/211,211, filed on Mar. 14, 2014, now Pat. No. 9,182,075.
(Continued)

(51) Int. Cl.
*B29C 65/00* (2006.01)
*F16M 13/02* (2006.01)
(Continued)

(52) U.S. Cl.
CPC ............... *F16M 13/02* (2013.01); *B32B 7/12* (2013.01); *C09J 7/00* (2013.01); *C09J 7/02* (2013.01);
(Continued)

(58) Field of Classification Search
CPC ......... F16B 47/003; F16M 13/02; B32B 7/02; B32B 7/04; B32B 33/00; B32B 3/06;
(Continued)

(56) References Cited

U.S. PATENT DOCUMENTS 1,739,296 A    12/1929    Du Pont
2,884,342 A    4/1959    Wolff
(Continued)

FOREIGN PATENT DOCUMENTS

CN    1284983 A    2/2001
CN    1508204 A    6/2004
(Continued)

OTHER PUBLICATIONS

Extended European Search Report dated Aug. 11, 2015 in connection with Application No. 13738720.5.
(Continued)

*Primary Examiner* — Todd M Epps
(74) *Attorney, Agent, or Firm* — Wolf, Greenfield & Sacks, P.C.

(57) ABSTRACT

Gecko-like adhesive application devices suited for dynamic applications are disclosed, where the device can be easily applied to target substrates, exhibiting a firm hold, and subsequently released therefrom. Gecko-like adhesive application devices that are suited for sustained holding after easy application (e.g., on vertical or inclined surfaces or ceiling) also are disclosed.

20 Claims, 27 Drawing Sheets

Related U.S. Application Data

(60) Provisional application No. 61/781,102, filed on Mar. 14, 2013.

(51) Int. Cl.
| | |
|---|---|
| *F16B 47/00* | (2006.01) |
| *C09J 7/02* | (2006.01) |
| *B32B 7/12* | (2006.01) |
| *C09J 7/00* | (2006.01) |
| *F16B 11/00* | (2006.01) |

(52) U.S. Cl.
CPC .......... *F16B 11/006* (2013.01); *F16B 47/003* (2013.01); *C09J 2201/626* (2013.01)

(58) Field of Classification Search
CPC .... B32B 5/26; B32B 37/24; C09J 7/00; C09J 7/02; C09J 2201/626
USPC ................................ 248/205.3, 683; 156/60
See application file for complete search history.

(56) References Cited

U.S. PATENT DOCUMENTS

| | | | |
|---|---|---|---|
| 3,653,381 A | 4/1972 | Warnken | |
| 3,691,140 A | 9/1972 | Silver | |
| 4,357,198 A | 11/1982 | Ezquerro | |
| 4,851,076 A | 7/1989 | Manusch et al. | |
| 4,915,768 A | 4/1990 | Soderberg | |
| 4,926,526 A | 5/1990 | Brown et al. | |
| 4,967,740 A | 11/1990 | Riedel | |
| 5,049,416 A | 9/1991 | Wilczynski | |
| 5,269,871 A | 12/1993 | Longworth et al. | |
| 5,399,219 A | 3/1995 | Roessler et al. | |
| 5,516,581 A | 5/1996 | Kreckel et al. | |
| 5,722,127 A | 3/1998 | Coates | |
| 5,747,131 A | 5/1998 | Kreckel | |
| 5,865,945 A | 2/1999 | McConaughy | |
| 6,045,642 A | 4/2000 | Takeuchi et al. | |
| 6,120,867 A | 9/2000 | Hamerski et al. | |
| 6,302,177 B1 | 10/2001 | Gruber | |
| 6,403,206 B1 | 6/2002 | Bries et al. | |
| 6,558,789 B1 | 5/2003 | Hamerski et al. | |
| 6,569,521 B1 | 5/2003 | Sheridan et al. | |
| 6,572,945 B2 | 6/2003 | Bries et al. | |
| 6,701,580 B1 | 3/2004 | Bandyopadhyay | |
| 6,737,160 B1 | 5/2004 | Full et al. | |
| 6,872,439 B2 | 3/2005 | Fearing et al. | |
| 6,913,075 B1 | 7/2005 | Knowles et al. | |
| 7,011,723 B2 | 3/2006 | Full et al. | |
| 7,056,409 B2 | 6/2006 | Dubrow | |
| 7,066,182 B1 | 6/2006 | Dunshee | |
| 7,132,161 B2 | 11/2006 | Knowles et al. | |
| 7,144,624 B2 | 12/2006 | Knowles et al. | |
| 7,175,723 B2 | 2/2007 | Jones et al. | |
| 7,181,811 B1 | 2/2007 | Tomanek et al. | |
| 7,229,685 B2 | 6/2007 | Full et al. | |
| 7,762,362 B2 | 7/2010 | Cutkosky et al. | |
| 7,780,810 B2 | 8/2010 | Hamano | |
| 8,108,974 B2 | 2/2012 | Graf | |
| 8,557,378 B2 | 10/2013 | Yamanaka et al. | |
| 9,182,075 B2 * | 11/2015 | Crosby .................... | C09J 7/02 |
| 9,395,038 B2 * | 7/2016 | Crosby .................... | B32B 5/26 |
| 9,440,416 B2 * | 9/2016 | Crosby .................... | C09J 7/02 |
| 2002/0095130 A1 | 7/2002 | Seitter et al. | |
| 2003/0038408 A1 | 2/2003 | Schulte | |
| 2003/0124312 A1 | 7/2003 | Autumn | |
| 2003/0134112 A1 | 7/2003 | Kreckel et al. | |
| 2003/0232190 A1 | 12/2003 | O'Leary et al. | |
| 2004/0009353 A1 | 1/2004 | Knowles et al. | |
| 2004/0046094 A1 | 3/2004 | Lan | |
| 2004/0076822 A1 | 4/2004 | Jagota et al. | |
| 2005/0119640 A1 | 6/2005 | Sverduk et al. | |
| 2005/0148984 A1 | 7/2005 | Lindsay et al. | |
| 2005/0181170 A1 | 8/2005 | Fearing et al. | |
| 2006/0078725 A1 | 4/2006 | Fearing et al. | |
| 2006/0202355 A1 | 9/2006 | Majidi et al. | |
| 2007/0232974 A1 | 10/2007 | Serola | |
| 2007/0289786 A1 | 12/2007 | Cutkosky et al. | |
| 2008/0025822 A1 | 1/2008 | Kim et al. | |
| 2008/0164080 A1 | 7/2008 | Asbeck et al. | |
| 2009/0106951 A1 | 4/2009 | Edwards et al. | |
| 2010/0038502 A1 | 2/2010 | Lan | |
| 2010/0044491 A1 | 2/2010 | Ritchey et al. | |
| 2010/0136281 A1 | 6/2010 | Sitti et al. | |
| 2010/0175836 A1 | 7/2010 | Lam | |
| 2010/0221496 A1 | 9/2010 | de Jong | |
| 2012/0204383 A1 | 8/2012 | Wood et al. | |
| 2012/0216949 A1 | 8/2012 | Stachowski et al. | |
| 2013/0273333 A1 | 10/2013 | Meier et al. | |
| 2014/0030490 A1 | 1/2014 | Crosby et al. | |
| 2014/0304953 A1 | 10/2014 | Crosby et al. | |
| 2014/0305569 A1 | 10/2014 | Crosby et al. | |
| 2014/0312188 A1 | 10/2014 | Crosby et al. | |
| 2014/0352881 A1 | 12/2014 | Crosby et al. | |

FOREIGN PATENT DOCUMENTS

| | | |
|---|---|---|
| CN | 1985288 A | 6/2007 |
| CN | 101528169 A | 9/2009 |
| CN | 2013-56127 Y | 12/2009 |
| DE | 4339604 A1 | 5/1995 |
| DE | 20-2010-014239 U1 | 12/2010 |
| EP | 1710287 A2 | 10/2006 |
| EP | 2522498 A1 | 11/2012 |
| JP | 55-52721 A | 4/1980 |
| JP | 2001-104118 A | 4/2001 |
| JP | 2002-501107 A | 1/2002 |
| JP | 2005-250806 A | 9/2005 |
| JP | 2005-298641 A | 10/2005 |
| RU | 2381969 C2 | 2/2010 |
| RU | 111405 U1 | 12/2011 |
| WO | WO 99/37729 A1 | 7/1999 |
| WO | WO 99/55791 A1 | 11/1999 |
| WO | WO 2008/019994 A1 | 1/2008 |
| WO | WO 2008/028120 A1 | 3/2008 |
| WO | WO 2011/019511 A2 | 2/2011 |
| WO | WO 2012/078249 A2 | 6/2012 |

OTHER PUBLICATIONS

Extended European Search Report dated Aug. 4, 2016 in connection with Application No. 14749538.6.
International Search Report and Written Opinion dated Jul. 31, 2012 in connection with Application No. PCT/US2011/057309.
International Preliminary Report on Patentability dated May 2, 2013 in connection with Application No. PCT/US2011/057309.
International Search Report and Written Opinion dated Apr. 25, 2013 in connection with Application No. PCT/US2013/021846.
International Preliminary Report on Patentability dated Jul. 31, 2014 in connection with Application No. PCT/US2013/021846.
International Search Report dated Aug. 28, 2014 in connection with Application No. PCT/US2014/027392.
International Preliminary Report on Patentability mailed Sep. 24, 2015 in connection with Application No. PCT/US2014/027392.
International Search Report dated May 22, 2014 in connection with Application No. PCT/US2014/014755.
International Preliminary Report on Patentability dated Aug. 20, 2015 in connection with Application No. PCT/US2014/014755.
International Search Report and Written Opinion dated Aug. 28, 2014 in connection with Application No. PCT/US2014/028422.
International Preliminary Report on Patentability mailed Sep. 24, 2015 in connection with Application No. PCT/US2014/028422.
No Author Listed, Database WPI Week 201002. Thomson Scientific, London, GB. 2009:XP002742926:1 page.
Bartlett et al., Draping polymer adhesives. Polymer Science and Engineering, University of Massachusetts Amherst Gecko Workshop. Jul. 2010: 1 page.
Bartlett et al., Looking beyond fibrillar features to scale gecko-like adhesion. Adv Mater. 2012;24:1078-1083.

(56) References Cited

OTHER PUBLICATIONS

Boesel et al., Gecko-inspired surfaces: a path to strong and reversible dry adhesives. Adv Mater. May 18, 2010;22(19):2125-37. doi: 10.1002/adma.200903200.
Chan et al., Designing model systems for enhanced adhesion. MRS Bulletin. Jun. 2007;32(6):496-503.
Creton et al., Materials science of adhesives: how to bond things together. MRS Bulletin. Jun. 2003;28(6):419-423.
Creton, Pressure-sensitive adhesives: an introductory course. MRS Bulletin. Jun. 2003;28(6):434-439.
Creton et al., Sticky feet: from animals to materials. MRS Bulletin. Jun. 2007;32(6):466-472.
Crosby et al., Adhesive failure analysis of pressure-sensitive adhesives. J Poly Sci Part B: Poly Phys. Dec. 1999;37(24):3455-3472.

* cited by examiner

DEVICES FOR APPLICATION AND LOAD BEARING AND METHOD OF USING THE SAME

PRIORITY CLAIMS AND RELATED APPLICATIONS

This Application is a continuation claiming the benefit under 35 U.S.C. §120 of U.S. application Ser. No. 14/211,211 filed on Mar. 14, 2014, which claims the benefit of priority under 35 U.S.C. §119(e) to U.S. Provisional Application Ser. No. 61/781,102 filed on Mar. 14, 2013, both of which are herein incorporated by reference in their entireties.

GOVERNMENT RIGHTS

The United States Government has certain rights to the invention pursuant to Grant No. Grant No. N66001-08-C-2054 from Department of the Navy to the University of Massachusetts.

TECHNICAL FIELD

The present disclosure generally relates to designs, devices, materials and methods useful for weight bearing. More particularly, embodiments described herein relate to gecko-like adhesive application devices that are suited for dynamic applications using a human hand or robot arm (e.g., simple grip, easily applied to and released from target substrates, and hold firmly after multiple load cycles). Gecko-like adhesive application devices may be suited for sustained weight bearing holding after easy application (e.g., on vertical or inclined surfaces or ceiling).

BACKGROUND

A recent technological breakthrough was a class of elastomer-based adhesive devices that have high load capacity, are reusable, easy release and suitable for extended and repeated use. (See, e.g., WO 2012/078249 (PCT/US2011/057309), which is incorporated herein by reference in its entirety.) While the technology substantially advances the state of the art in adhesive technology, there remains a significant and ongoing need for adhesive systems that allow adjustable weight-bearing angles, high-load bearing and highly stable, yet provide simple, non-damaging release and repeated use while being cost-effective to produce.

SUMMARY

Various embodiments provide for gecko-like adhesive application devices that are suited for dynamic applications where the device can be easily applied to target substrates, exhibiting a firm hold, and subsequently released therefrom. Various embodiments of the adhesive application devices are suited for sustained holding after easy application (e.g., on vertical or inclined surfaces or ceiling), are high-load bearing, and are highly stable. The gecko-like adhesive devices disclosed in this patent application provide new methods for establishing reproducible areas of interfacial contact between an adhesive pad and other materials, including rough and/or porous materials.

In one aspect, various embodiments generally relate to an adhesive device for surface holding or weight-bearing. The device includes: an adhesive pad and a press assembly. The adhesive pad includes: a backing layer having high in-plane stiffness and applied thereto is a layer of an elastic material having an adhering surface for releasably adhering to a target surface, a blocker of a rigid material, and a tether component connected to the blocker at one end and the backing layer on the opposite end. The press assembly includes: one or more presses, a frame supporting the one or more presses by one or more joints, a connector component extending from the frame and attached to the one or more presses, and a passageway positioned on the frame and sized to be passable by the tether component and impassible by the backing layer or the blocker. The tether component is positioned through the passageway with the backing layer proximal to one or more presses on one side of the frame and with the blocker proximal to the connector component on another side of the frame.

In another aspect, various embodiments generally relate to a hand-held adhesive device for surface holding or weight-bearing. The device includes: a backing layer having high in-plane stiffness and applied thereto is a layer of an elastic material having an adhering surface for releasably adhering to a target surface; a tether component connected to the backing layer; and a frame connected to the tether on one end of the frame and comprising a firm edge on the other end of the frame.

In yet another aspect, various embodiments generally relate to a hand-held adhesive device. The device includes: a backing layer and a panel frame for supporting the backing layer. The backing layer has high in-plane stiffness and is applied thereto is a layer of an elastic material having an adhering surface for releasably adhering to a target surface. The panel frame includes an arc shaped portion and at least a first flat panel portion extending therefrom. The backing layer is firmly attached to the panel frame partially at the arc and partially on the first flat panel such that the adhesive layer forms a flat surface adapted to adhere to a target surface when the frame is pressed against the target surface from the arc to the flat panel.

In yet another aspect, various embodiments generally relate to a kit that includes components suitable for assembling into a hand-held adhesive device for surface holding or weight-bearing.

DETAILED DESCRIPTION

A recent technological breakthrough was a class of elastomer-based adhesive devices that have high load capacity, are reusable, easy release and suitable for extended and repeated use. (See, e.g., WO 2012/078249 (PCT/US2011/057309), which is incorporated herein by reference in its entirety.) While the technology substantially advances the state of the art in adhesive technology, there remains a significant and ongoing need for adhesive systems that allow adjustable weight-bearing angles, are high-load bearing and highly stable, yet provide simple, non-damaging release and repeated use while being cost-effective to produce.

Illustrative embodiments relate to unique releasable adhesive devices, as well as related methods, that enable simultaneously adherence to two or multiple target surfaces of various nature. Such devices may exhibit high load capacity, are reusable, are easy to release and are suitable for extended and repeated use. Adhesive systems and devices described herein may be designed to fit a variety of utilities (e.g., household weight-bearing shelves and holders, components for transportation, athletic equipment, labels and advertising posts, automobile interior trims, permanent or reversible fasteners, as well as instruments and devices for industrial, commercial, medical or military applications).

In contrast to conventional development of gecko-type adhesives, some embodiments do not require the use of surface fibrillar structures to achieve desired attributes. Though, for some embodiments, the device may employ various configurations of surface fibrillar structures. Following the principles disclosed herein, one may mimic the engineering design of the toe and leg structures of common examples in Nature, such as geckos in vertical climbing.

In some embodiments, the adhesive pad system utilized herein employs a "dry" adhesive pad structure (sometimes referred to as a "T-pad"). The basic structure of the adhesive device is referred to as a "pad", which is subsequently connected to a tether (e.g., a synthetic fabric tether, sometimes referred to as "tendon"). The tether may be arranged so as to maintain stiff along the primary axis of loading. The connection between the tendon and the pad has pre-defined dimensions, orientation, and spatial location, according to particular applications at hand, that can be modified to control the release strategy and provide a suitable balance of shear and normal loading. Properly designed, the adhesive pad device can support relatively high loads under shear, normal, and multi-mode (i.e., peel) loadings while requiring minimal forces and energy for release (or separation) under specifically-designed release strategies.

Figure 1A:
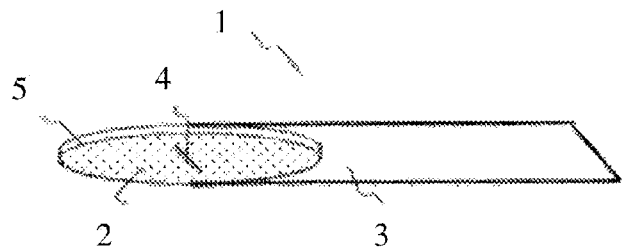
FIGS. 1A-1B show schematic illustrations of exemplary embodiments of adhesive pads.
Figure 1B:
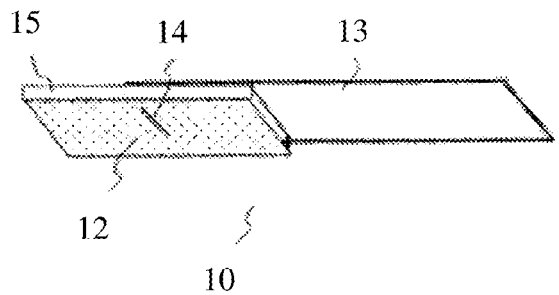

Two exemplary embodiments of adhesive pad devices are schematically illustrated in FIGS. 1A-1B, wherein FIG. 1 A depicts an adhesive pad 1 having an adhering surface 2 having a circular outer boundary 5. The adhesive pad is attached or otherwise coupled to a tether component 3 at line 4. Similarly, FIG. 1 B depicts an adhesive pad 10 having an adhering surface 12 having a rectangular outer boundary 15. The adhesive pad is coupled (e.g., connected, attached) to a tether component 13 at line 14. It should be appreciated that other types and shapes of adhering surfaces may be employed, and are not limited to those specifically described herein. For example, the adhering surface may have any suitable shape, such as circular, rectangular, polygonal, irregular, oblong, etc.

Figure 2:
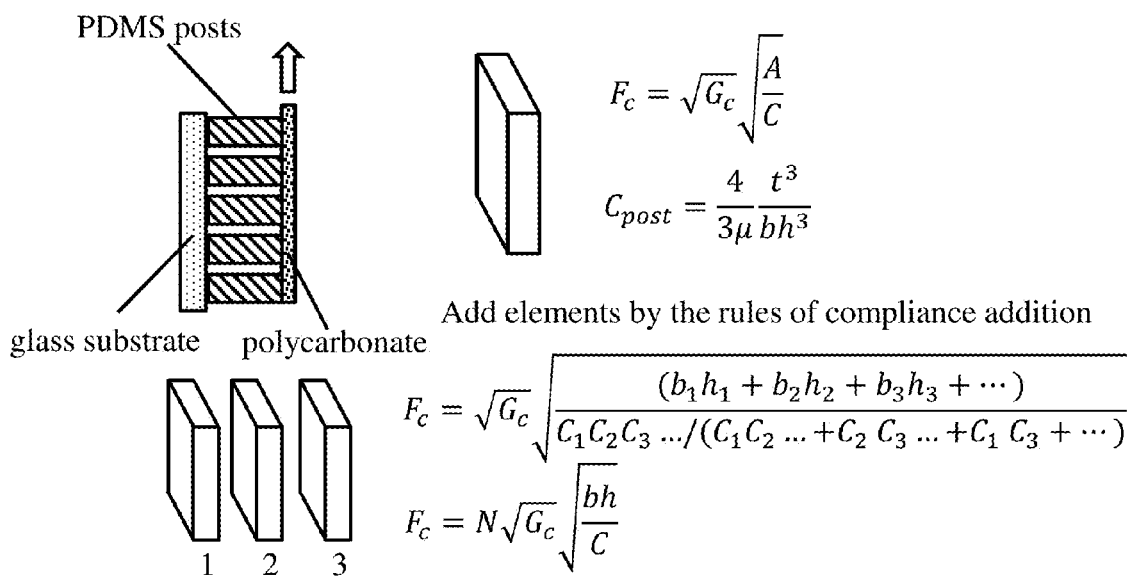
FIG. 2 shows certain design factors and schematic illustrations.

Such an adhesive pad design represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity (Fe) of an interface is governed by three simple parameters, which are dependent on both the geometry and material properties of the interface. To design reversible adhesives which can adhere to various substrates, the interfacial interactions (Ge)) should rely upon non-specific van der Waals forces, rendering Ge an ineffective control parameter. Therefore, to scale Fe for adhesive materials the material system must not just rely on area on contact (A) or the system compliance (C) but must develop attributes that increase the A/C ratio. This presents a challenge; materials should generally be soft to increase true contact, yet stiff to be able to withstand high loads. Soft materials are able to create large-scale contact but are compliant when subject to relatively high loads, while stiff materials are less likely to be able to create extensive contact with a substrate; though, both cases result in a null effect on the A/C ratio. Various embodiments provide a mechanism for maximizing A/C, and most importantly, tuning this governing parameter for different applications.

Figure 3:
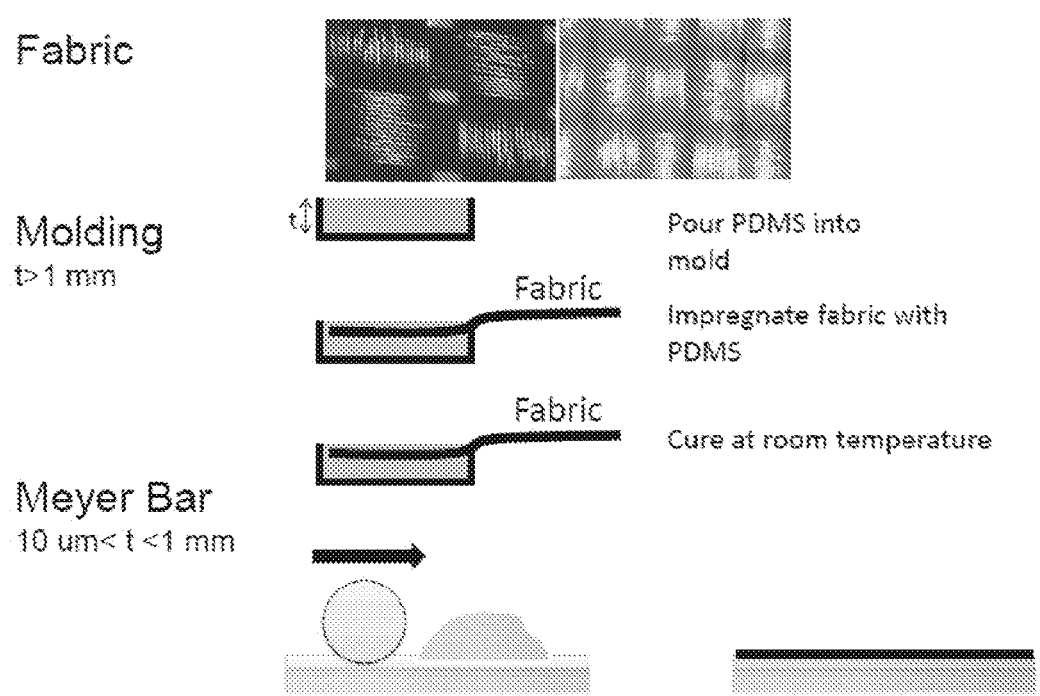
FIG. 3 shows a schematic illustration of an exemplary fabrication process.

As schematically illustrated in FIG. 3, an efficient and effective fabrication method may be used to fabricate the adhesive pad. The method involves integrating a thin layer of an elastic elastomer on the surface of a fabric.

The tether may be connected to the adhesive pad through any suitable method, such as conventional sewing, stitching, or gluing, which allows easy control of dimensional, orientational, and spatial location of the attachment. The attachment should provide sufficient load sharing and load bearing capacity, which can be controlled through the method of attachment, such as via the stitching pattern, width, and length. Appropriate stitching patterns include straight stitching, zigzag stitching, multi zigzag stitch, satin stitching, honeycomb stitching, ladder stitch, double overlock stitch, and criss-cross stitching. Non-stitch attachment methods, such as hot melt adhesives for fabrics, may also be used.

For example, in an embodiment, a tether-pad connection includes a straight-line stitch that is centered on the one axis of the pad and extends to a length of approximately ⅔ the chord length perpendicular the second pad axis. The tether-pad connection maintains rotational freedom while maintaining high stiffness in the direction of loading. The tether-pad connection may also maintain substantially equal load sharing along the entire length of the connection.

One adhesive pad can act independently or in conjunction with an array of adhesive pads or units (sometimes referred to as a "T-surface"), which may be mounted with rotationally-free joints to a supporting substrate that can be rigid in one or more directions, for example. For certain applications, e.g., a large weight bearing shelf, multiple attachment points for the tether to the adhesive pad may also be employed.

Figure 4:
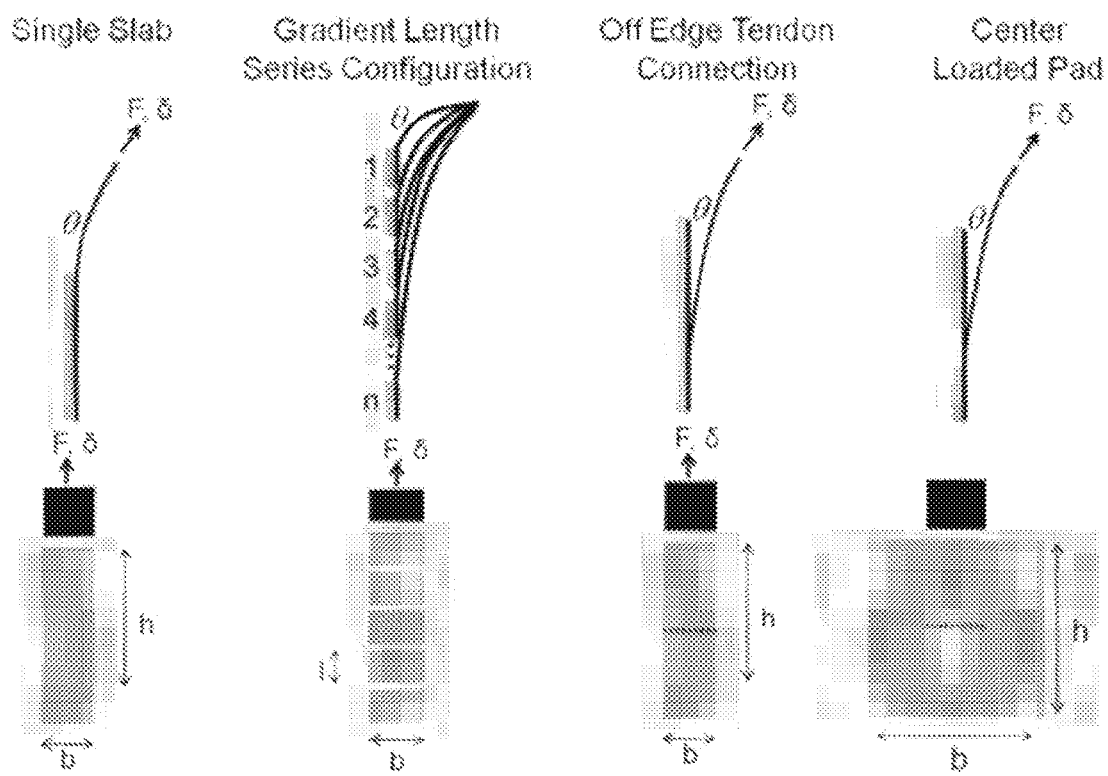
FIG. 4 shows schematic illustrations of various embodiments of a pad-tether connection.

FIG. 4 shows schematic illustrations of various adhesive pad configurations for the tether-pad connection. A single slab connection may include a continuous adhesive pad and support backing, which can then be divided into a larger number of discrete adhesive pads and support backings in which multiple tendons are used to create different configurations (e.g., a gradient length series configuration). The tether attached to the adhesive pad may allow for adjustment of the angle between the planar tether and the adhesive pad completely around the device, from about 0° to about 359°.

Figure 5A:
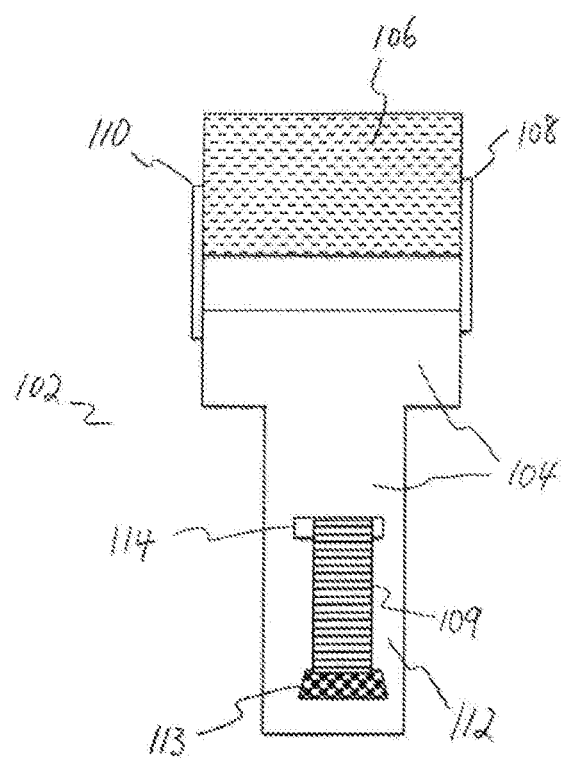
FIGS. 5A-5C show a schematic illustration of an exemplary embodiment of an adhesive device.
Figure 5B:
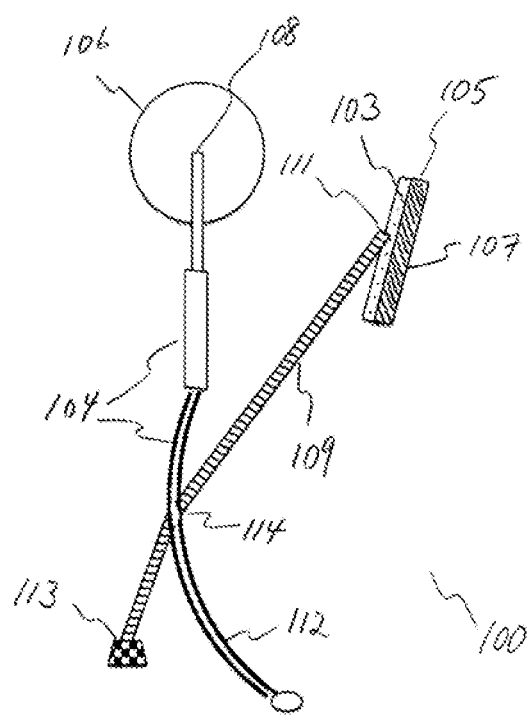
Figure 5C:
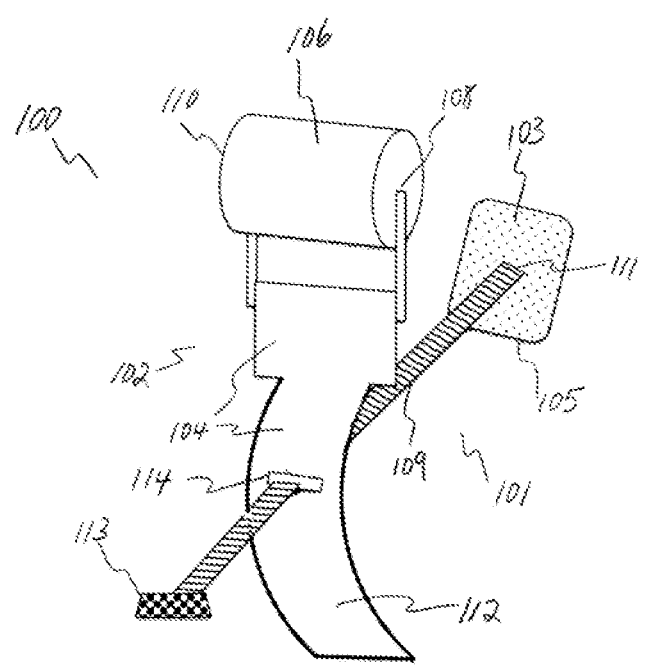
Figure 6A:
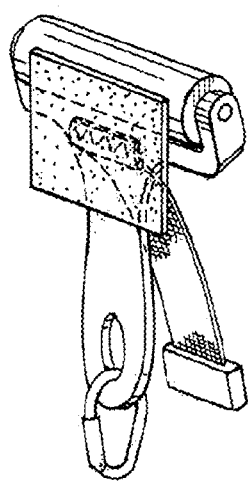
FIG. 6A-E shows an exemplary embodiment of an adhesive device.
Figure 6B:
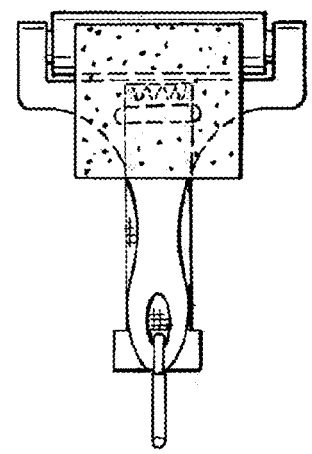
Figure 6C:
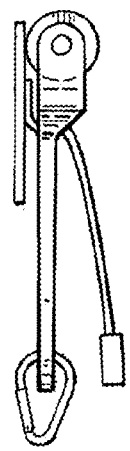
Figure 6D:
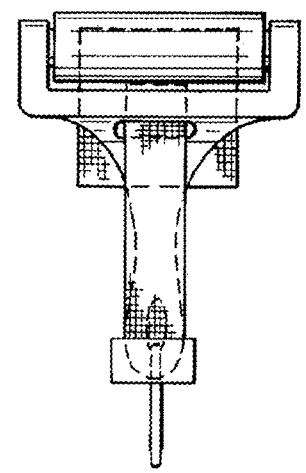
Figure 6E:
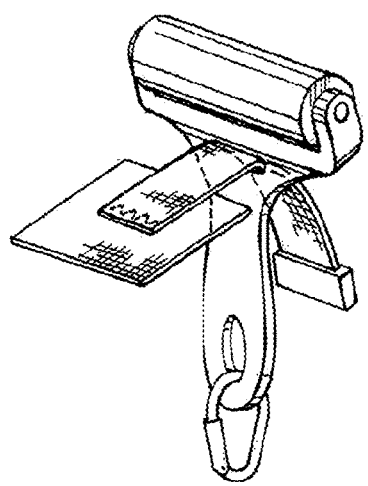

Referring to FIGS. 5A-5C, a schematic illustration of an exemplary embodiment of an adhesive device 100, which may be hand-held, is shown in a front view (a), a side view (b) and a perspective view (c). The adhesive device 100 includes an adhesive pad 101 and a roller assembly 102. The adhesive pad 101 includes a backing layer 103, an adhesive layer 105 comprised of a layer of an elastic material and having an adhering surface 107, a tether component 109 with its distal end connected to the backing layer 103 at 111. Blocker 113 is connected to the tether 109 at its proximal end. The roller assembly 102 includes a frame 104, a cylindrical roller 106 is rotationally supported by the frame 104 at a pair of joints 108 and 110. The frame extends to form a handle 112 for gripping. A passageway (slit) 114 is provided in the frame 104, through which the tether 109 may slide through, where the blocker 113 is located on one side and the backing layer 103 of the adhesive pad is located on the other side.

When in use, a user may hold the device by gripping the handle 112 with the adhering surface 107 facing the target adherent surface and the roller 106 facing the user. The user places the adhering surface 107 on the target adherent surface and presses and rolls the roller 106 against the backing layer 103 to form a tight contact to the adherent surface. FIGS. 6A-6E show an exemplary device in various perspectives.

When releasing the device from the adherent surface, as shown in FIGS. 7A-7E, the user applies a gentle tug and the tether components slides through the passageway in the frame and the adhesive rests on the leading edge of the roller once again. The device is now ready to be re-applied.

Figure 8A:
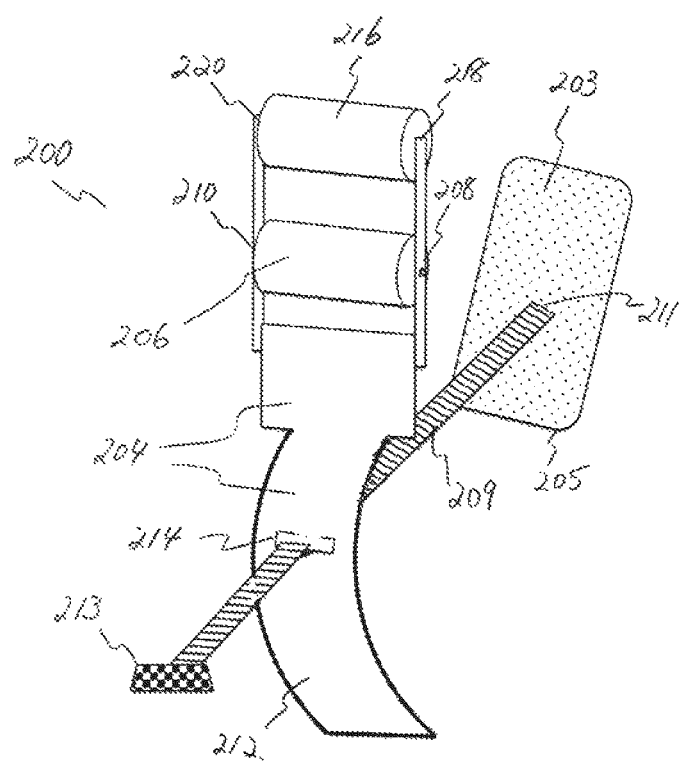
FIGS. 8A-8B shows a schematic illustration of an exemplary embodiment of an adhesive device having two rollers.
Figure 8B:
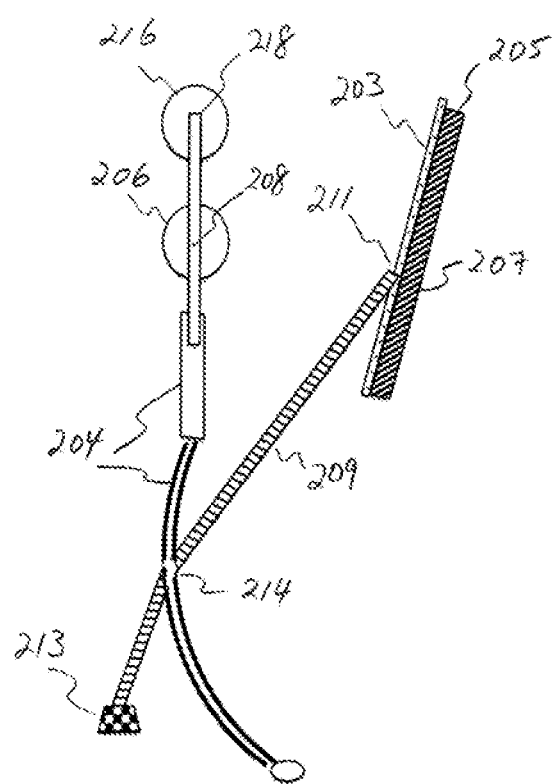

Referring to FIGS. 8A-8B, a schematic illustration of another embodiment of an adhesive device 200, which may be hand-held, is shown having two rollers disposed parallel to each other. Rollers 206 and 216 are rotationally supported by the frame 204 by two pairs of joints 208/210 and 218/220. When in use, the user holds the device by gripping the handle 212 with the adhering surface 207 facing the target adherent surface and the rollers 206 and 216 facing the user. The user places the adhering surface 207 on the target adherent surface and presses and rolls the rollers 206 and 216 against the backing layer 203 to form a tight contact to the adherent surface.

Figure 9:
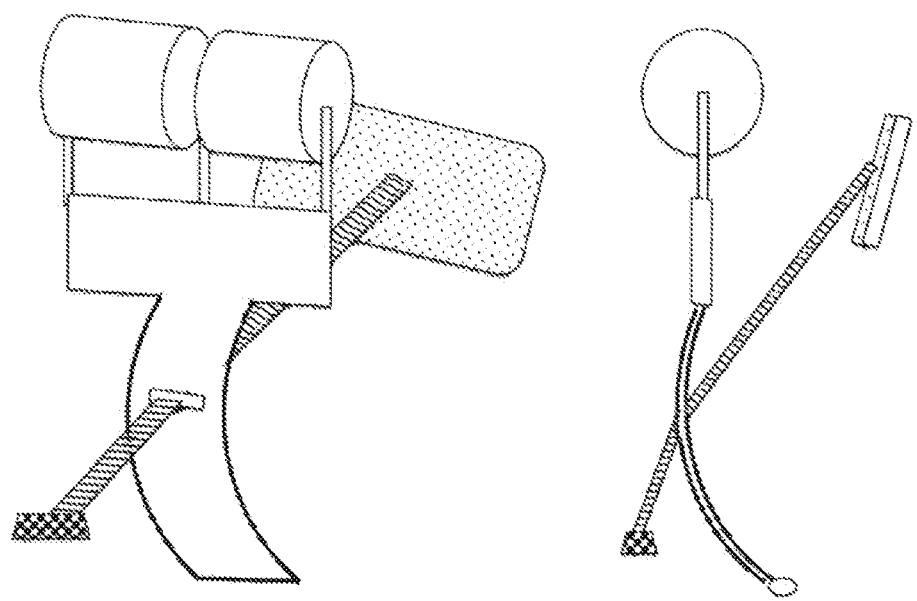
FIG. 9 shows a schematic illustration of an exemplary embodiment of an adhesive device having two rollers.

FIG. 9 shows an alternative embodiment also having two rollers, which are arranged consecutively having the same rotational axis.

The blocker may be designed to be detachable from the tether and can be easily reattached in place once the tether component is guided through the passageway.

Figure 10:
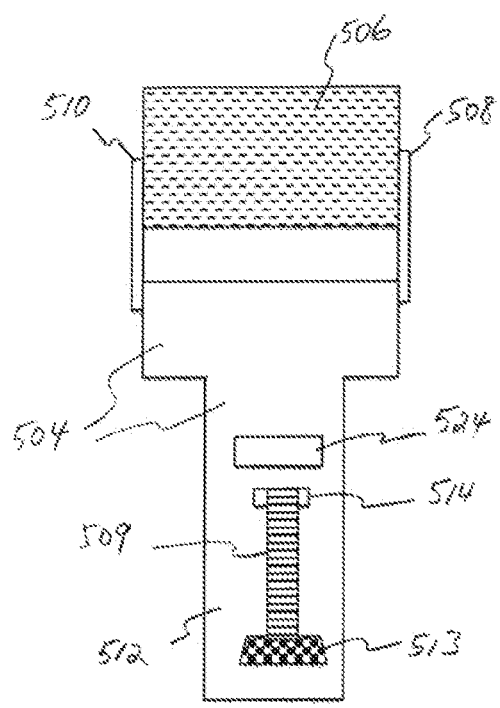
FIG. 10 shows a schematic illustration of an exemplary embodiment of an adhesive device.

Certain embodiments of the device may include more than one passageway to accommodate more than one size of tethers. For instance, as shown schematically in FIG. 10, two channels 514 and 524 are built in the frame as passageways for a large size tether and a small size tether. Such frames may be especially useful in a kit that includes differently sized adhesive pads.

Figure 11:
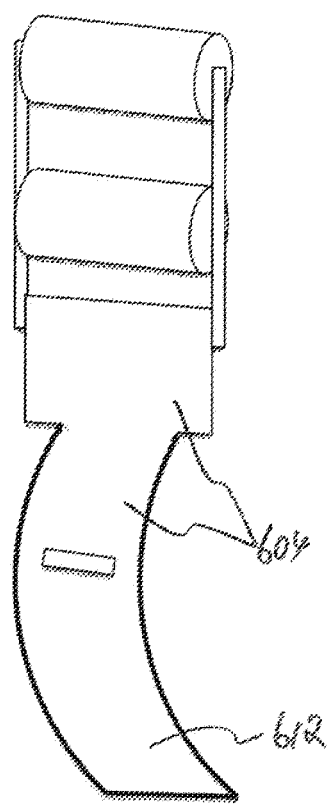
FIG. 11 shows a schematic illustration of an exemplary embodiment of an adhesive device.

Depending on the applications, the frame may be configured to be curved such that when being held by a user, the frame bends towards the user (see the frame 604 and handle 612 in FIG. 11).

One or more of the rollers, tethers, blockers, handles may be designed to be replaceable and/or as a tool kit easily assembled into the device. Different sized adhesive pads may be included in such a kit allowing the user to select a suitable adhesive pad and other components for use.

Figure 12:
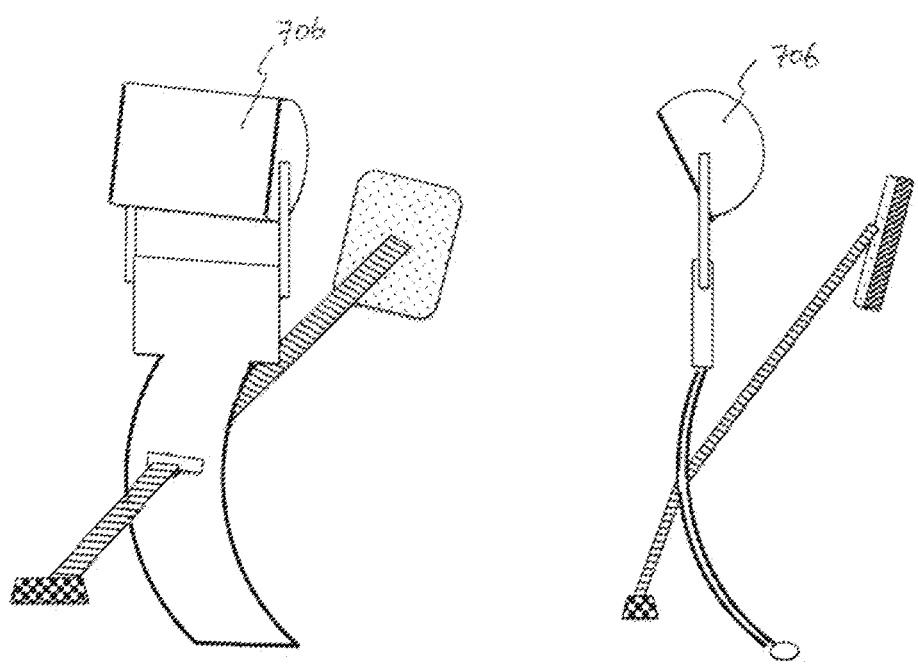
FIG. 12 shows a schematic illustration of an exemplary embodiment of an adhesive device.

The roller is preferably cylindrical or spherical in shape. As schematically depicted in FIG. 12, an alternative design includes a roller 706 that is half or a portion of a cylindrical roller.

The roller surface may be made of any suitable material such as rubber, plastic, wood, or metal. The frame and the handle may be a single piece or may form separate parts. A folding mechanism may be included such that the frame and handle can be folded smaller in size for easy carrying or storage, for example, in a carrying case.

Figure 13A:
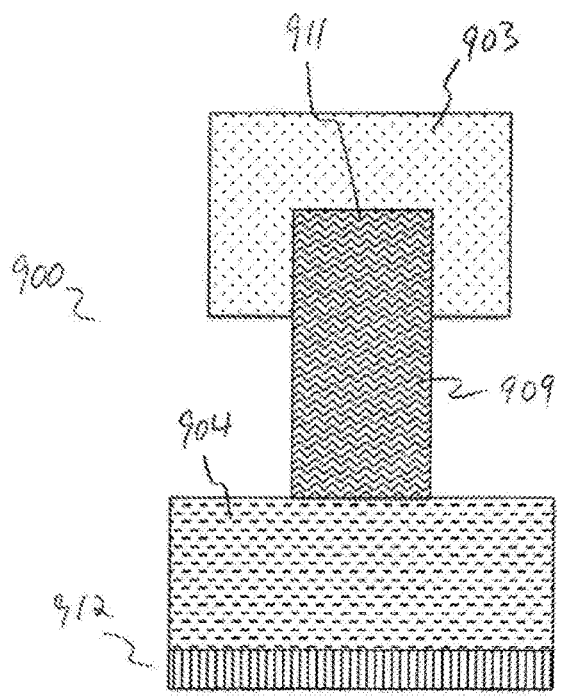
FIGS. 13A-13B show a schematic illustration of an exemplary embodiment of an adhesive device.
Figure 13B:
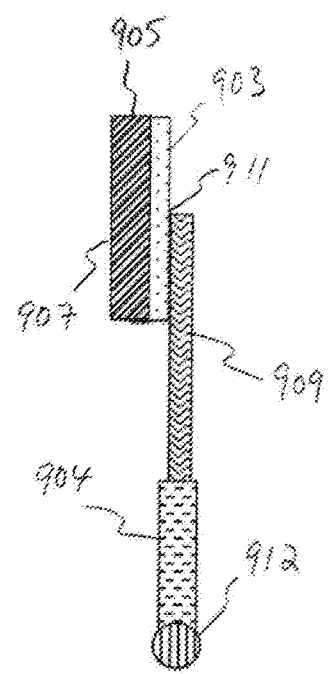

Additional embodiments of the adhesive device are shown in FIGS. 13A-13B. An adhesive device 900 may include a backing layer 903, an adhesive layer 905 comprised of a layer of an elastic material and having an adhering surface 907, a tether component 909 with its distal end connected to the backing layer 903 at 911. The tether 909 is attached to a frame 904 which is connected thereto at its proximal end. The frame 904 includes a straight and curved edge 912.

Figure 14A:
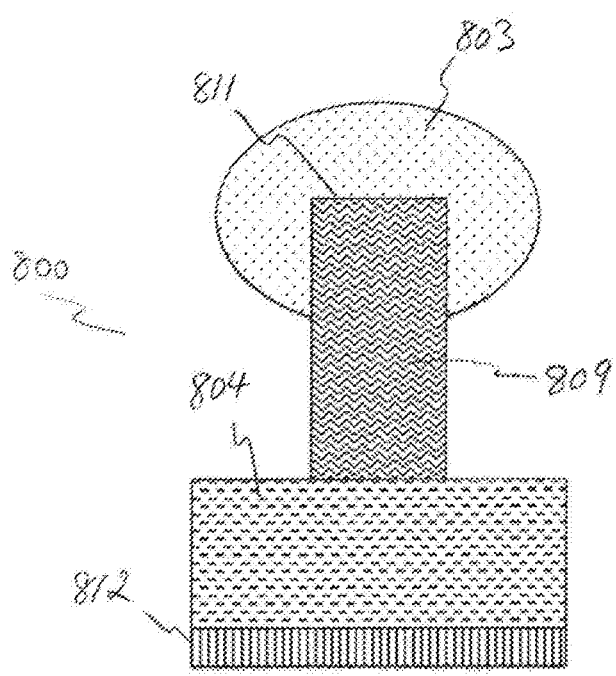
FIGS. 14A-14B show a schematic illustration of an exemplary embodiment of an adhesive device.
Figure 14B:
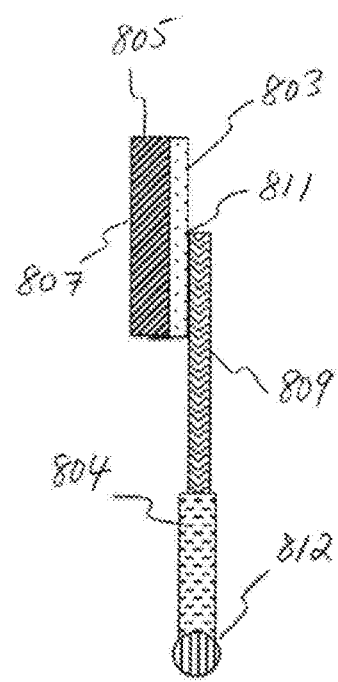
Figure 15A:
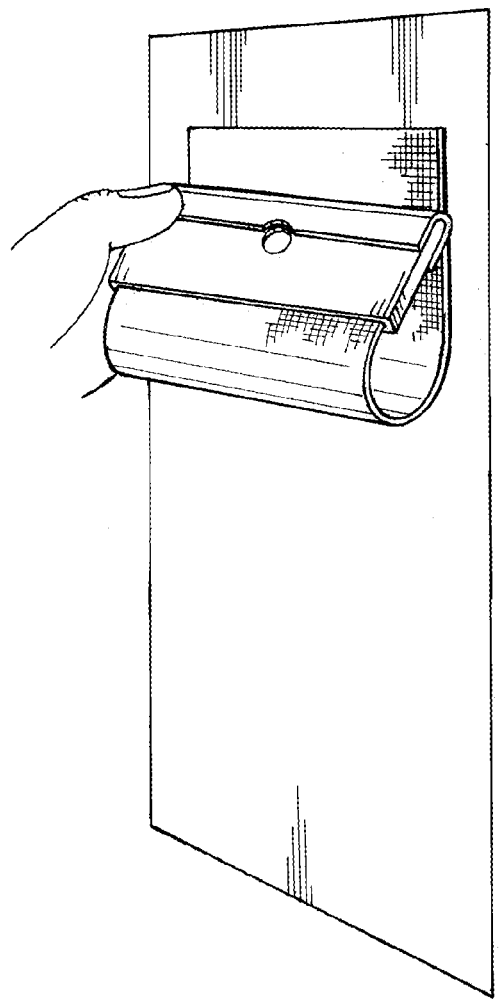
FIG. 15A-D shows an exemplary embodiment of an adhesive device in use.
Figure 15B:
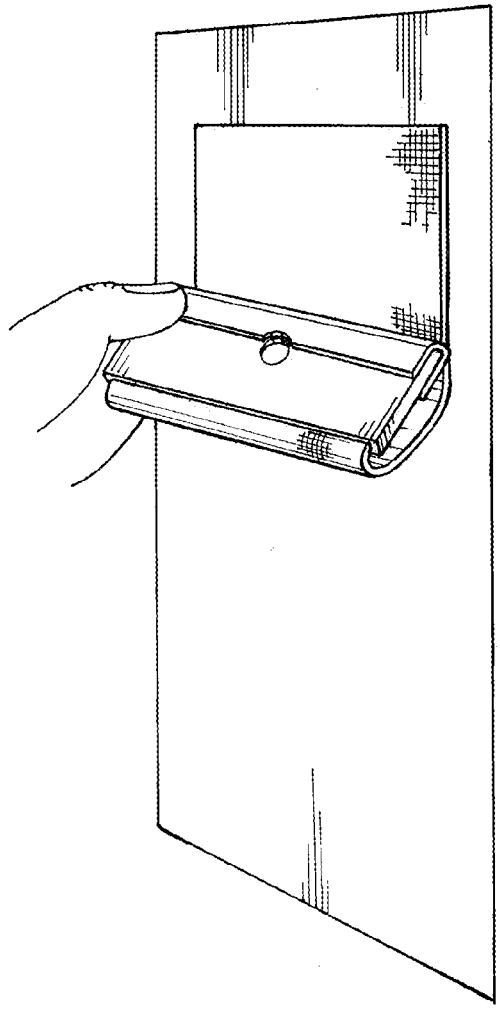
Figure 15C:
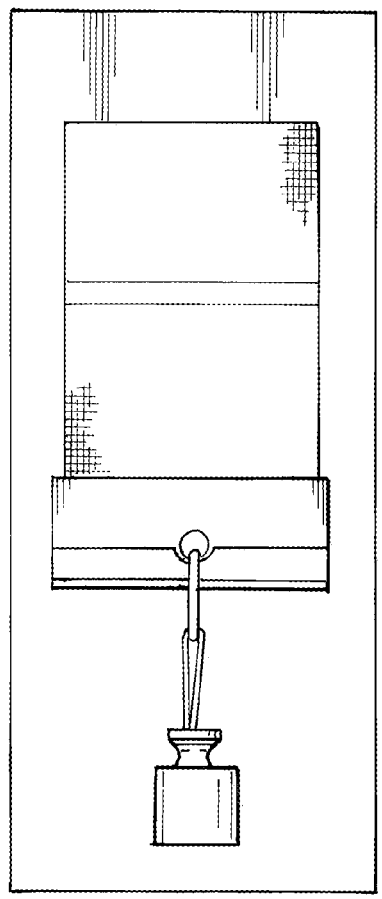
Figure 15D:
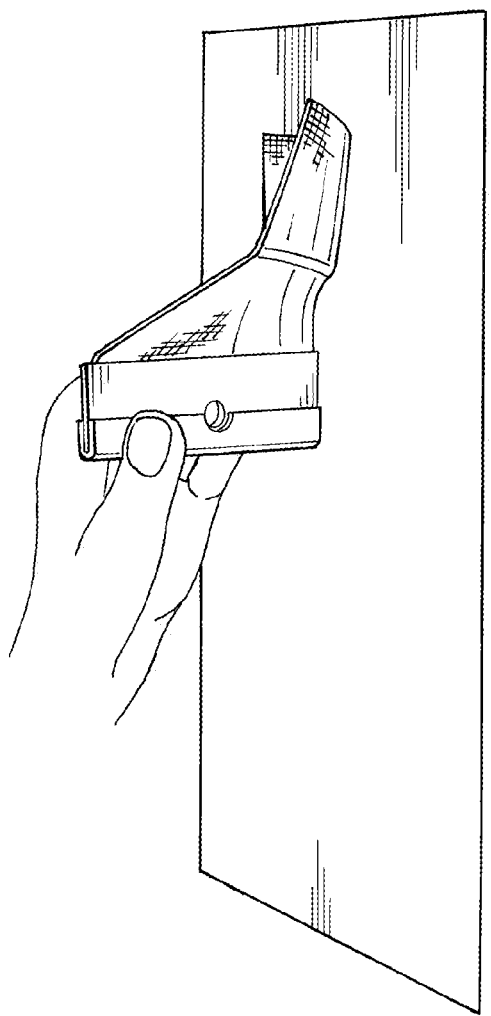
Figure 16A:
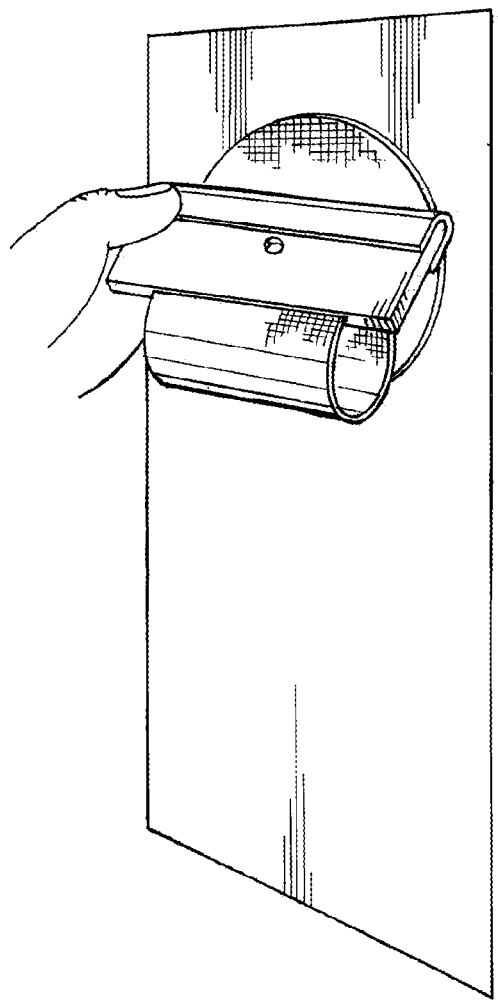
FIG. 16A-D shows an exemplary embodiment of an adhesive device in use.
Figure 16B:
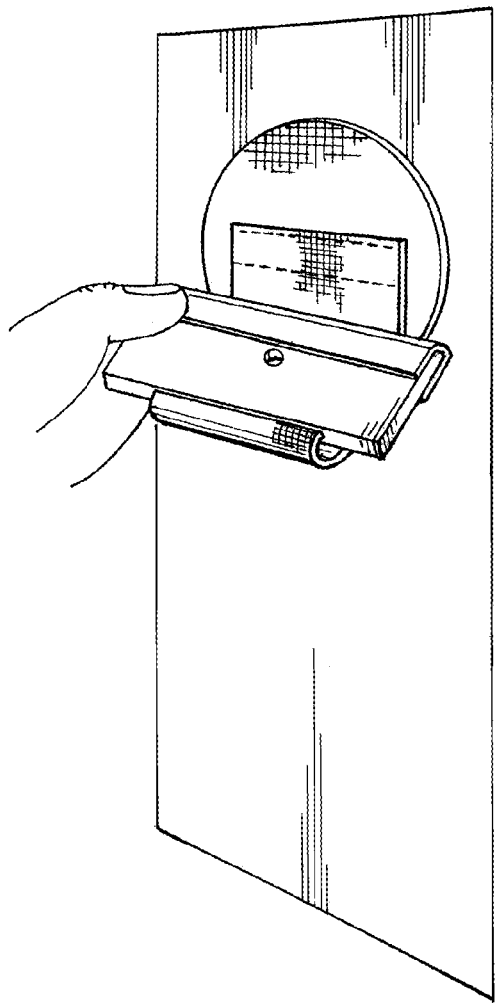
Figure 16C:
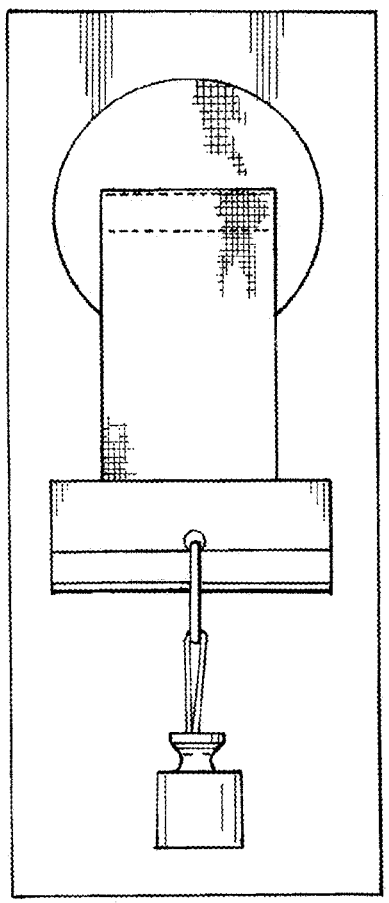
Figure 16D:
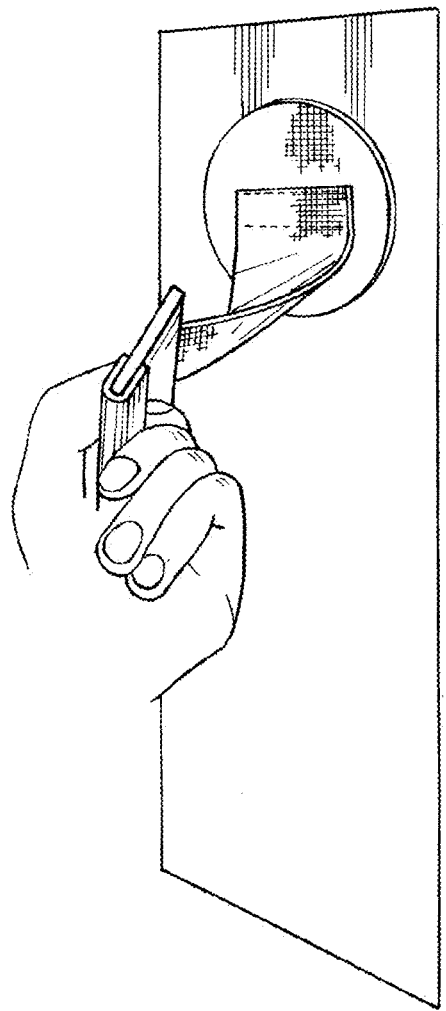

The adhesive device may have any suitable profile for the backing layer and adhering surface. FIGS. 14A-14B shows a device with an oval boundary for the backing layer and the adhering surface.

FIGS. 15A-15D and 16A-16D show schematic illustrations of exemplary devices in actual use. In FIGS. 15A-15D, an exemplary device having a rectangular adhering surface is shown to hold a weight after the adhering surface is pressed against a target surface. The device is readily released from the target surface with a gentle tugging force. In FIGS. 16A-16D, an exemplary device having a circular adhering surface is shown to hold a weight after the adhering surface is pressed against a target surface. The device is readily released from the target surface with a gentle tugging force. In each of the exemplary devices shown in FIGS. 15A-15D and 16A-16D, a connector (an orifice or a hook as shown) is provided as part of the device allowing a weight to be easily attached, hooked or fastened onto (or removed or unfastened from) the devices.

Figure 17A:
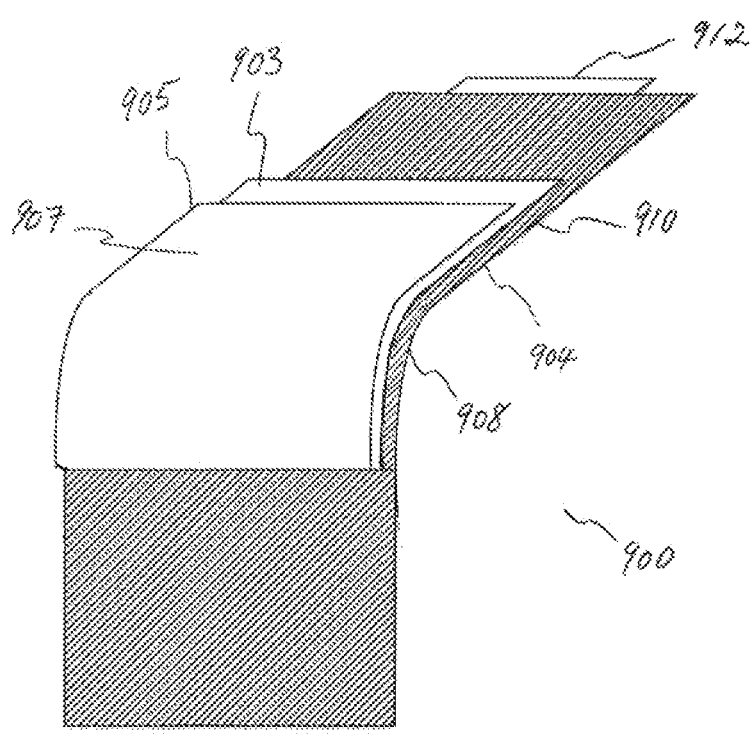
FIGS. 17A-E show schematic illustrations of exemplary embodiments of an adhesive device.
Figure 17B:
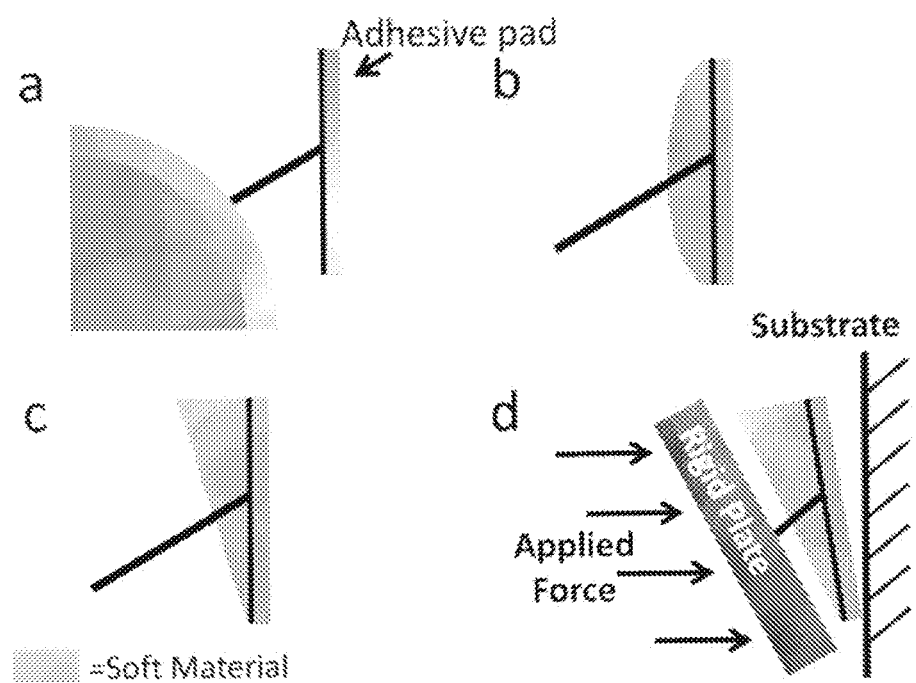
Figure 17C:
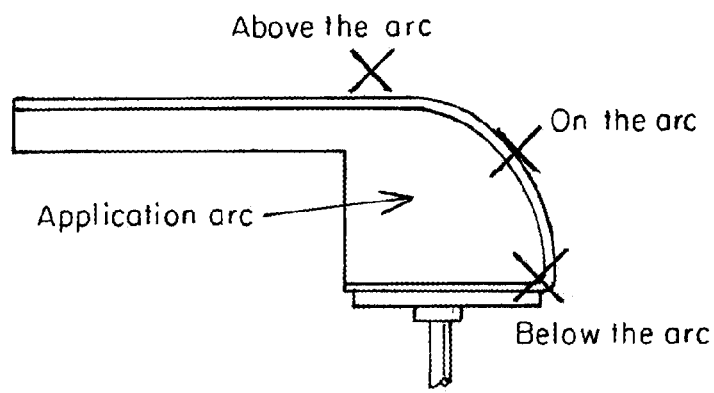
Figure 17D:
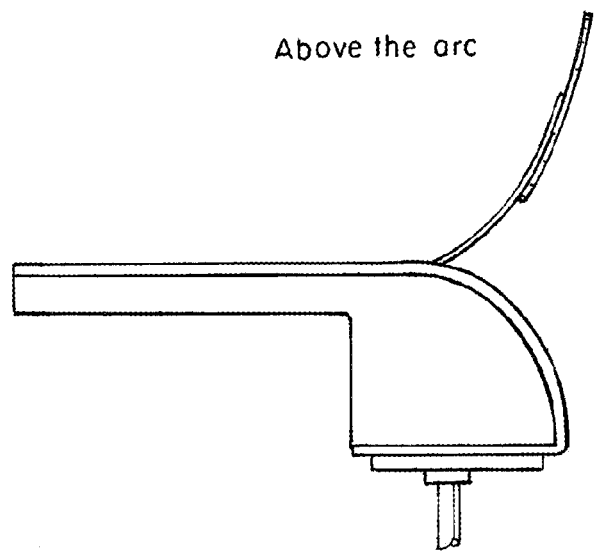
Figure 17E:
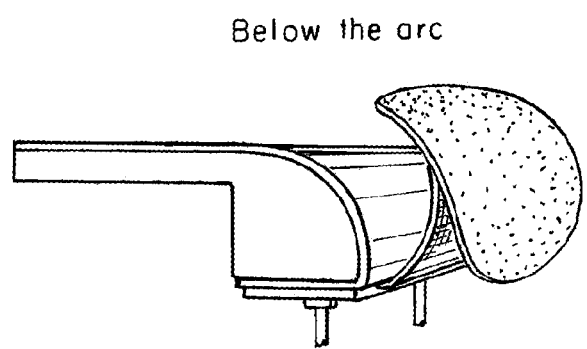
Figure 18A:
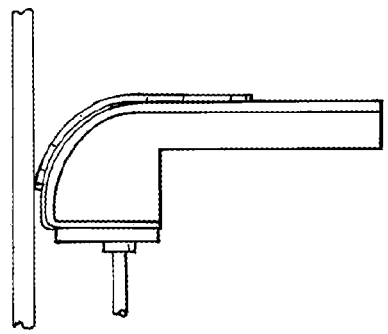
FIG. 18A-D shows an exemplary embodiment of an adhesive device in use.
Figure 18B:
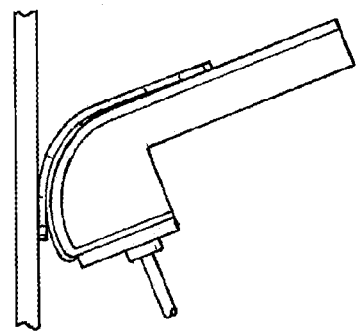
Figure 18C:
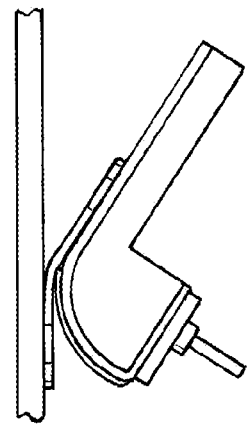
Figure 18D:
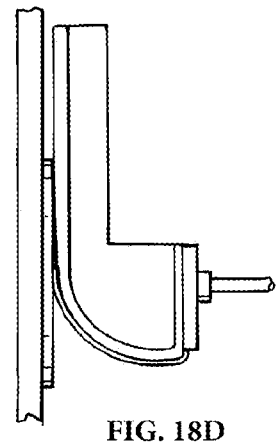

FIG. 17A shows a schematic illustration of another exemplary embodiment of an adhesive device. In FIG. 17A, the adhesive device 900 includes a backing layer 903 with an adhesive layer 905 comprising a layer of an elastic material applied thereto (e.g., impregnated or coated), so as to have an adhering surface 907. The backing layer 903 is supported by a panel frame 904 made of a rigid material. The panel frame 904, as shown, is in an arc-shaped portion 908 and a flat portion 910. The frame 904 may include or connect to a shelf, platform and/or handle 912 (e.g., an extension of an arm) upon which an article may be rested. The handle 912 may also include a mechanism for a hook or holding component for bearing weight. The arc portion 908 may have arms forming a 90° angle (as shown) or any other suitable angle. FIGS. 17B-17E show schematics of alternative application of an exemplary device. FIGS. 18A-18D and 19A-19B show schematic illustrations of an exemplary device according to this embodiment in actual use.

Figure 20A:
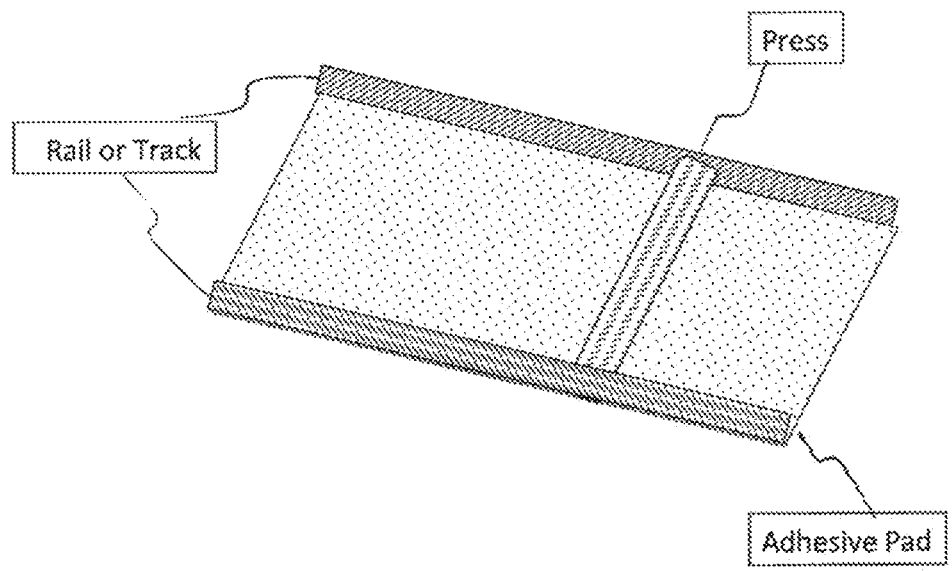
FIGS. 20A-20B illustrate an exemplary embodiment of an adhesive device.
Figure 20B:
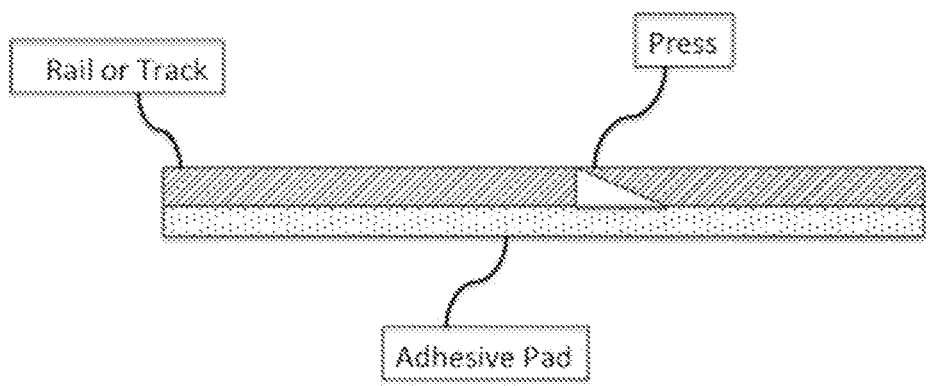

FIGS. 20A and 20B schematically illustrates an embodiment where an applicator device includes rails or tracks (including grooves, channels) and a press (a roller or a slider) positioned to be slidable on the rails or in the tracks. When the press slides over the adhesive pad, a pressing force is applied to the adhesive pad. As the press moves up and down (or back and forth) along the rail or track, it applies pressure to the adhesive pad/target surface interface. The manner in which pressure is applied may facilitate removal of defects such as air bubbles, to enable a more intimate contact and relatively strong adhesion between the adhesive pad and the target surface.

In one aspect, various embodiments generally relate to an adhesive device for surface holding or weight-bearing. The device may include: an adhesive pad and a press assembly. The adhesive pad may include: a backing layer having high in-plane stiffness and applied thereto is a layer of an elastic material (e.g., a substantially planar elastic layer) having an adhering surface for releasably adhering to a target surface, a blocker of a rigid material, and a tether component connected to the blocker at one end and the backing layer on the opposite end. The press assembly may include: one or more presses, a frame supporting the one or more presses by one or more joints, a connector component extending from the frame and attached to the one or more presses, and a passageway included in the frame and sized for the tether component to pass therethrough, and impassible by the backing layer or the blocker. The tether component may be positioned through the passageway with the backing layer proximal to one or more presses on one side of the frame and with the blocker proximal to the connector component on another side of the frame.

The terms "releasable" or "releasably", as used herein, refers to the capability of an object becoming free from attachment, mooring, adhesion, bonding, or other restraint from another object with no or minimal impairment, ruin, destruction or other damage to either object.

The term "impregnated", as used herein, refers to an object being filled, coated, covered, imbued, soaked, permeated, infiltrated, saturated, or otherwise contacted with a material. An object may be partially "impregnated", for example, partially filled, coated, covered, imbued, soaked, permeated, or infiltrated with a material.

The term "in-plane stiffness" refers to the resistance to deformation under a specified load applied in the plane of a material (e.g., a fabric material). The units of stiffness are force per distance. A material (e.g., a fabric material) is said to have "high" in-plane stiffness when the bending stiffness of the composite material (e.g., elastomer and fabric) is less than the in-plane stretching stiffness.

The target surface may be any suitable surface, for example, a surface of metal, wood, glass, carbon, polymers, gels, leather, plastic or ceramic.

In certain embodiments, the connector component is suitable for hand holding by a human or robotic hand or for connecting to an actuator.

In certain embodiments, the connector component may be a handle, lever, knob, switch, holder, hook, clasp, clip, or other suitable article to which the adhesive device may be coupled. In certain embodiments, the one or more presses may be, for example, rollers, sliders, compression pads, or other suitable articles that may be used for pressing against the adhesive device. The roller or sliders may be further attached with or to a hook or other fastening component (for example, for hanging).

In certain embodiments, the presses are rollers disposed in parallel with each other. In certain embodiments, the presses are rollers disposed side-by-side to each other. In certain embodiments, the presses are sliders and the frame comprises one or more rails or tracks configured to engage with and allow sliding of the sliders on the rails or along the tracks.

The backing layer may take any suitable size and shape, for example, with a substantially triangle, rectangular, square, or other polygons, circular, oval outer boundary, or in other complex or random curves or shapes.

The adhesive device may include any suitable number of presses (e.g., rollers, sliders, compression pads). In certain embodiments, the adhesive device includes a single press. In certain embodiments, the adhesive device includes two or more presses.

The press (e.g., rollers, sliders, compression pads) may take any suitable size and shape, for example, completely or partially cylindrical, spherical, wedge-shaped). The rollers may be disposed parallel to each other, side-by-side to each other, or alternative configurations.

The device may include, as needed, one, two or more passageways positioned on the frame. The size(s) of the passageways may be designed in consideration of the adhesive pads and tether components.

The handle, lever or holder, if present, may take any suitable shape and size, e.g., may be curved in shape for easy gripping or otherwise easy for connection with an actuator. The blocker may be designed to be detachable from the tether component.

In another aspect, various embodiments generally relate to a hand-held adhesive device for surface holding or weight-bearing. The device may include: a backing layer having high in-plane stiffness and applied thereto is a layer of an elastic material having an adhering surface for releasably adhering to a target surface; a tether component connected to the backing layer; and a frame connected to the tether on one end of the frame and comprising a firm edge on the other end of the frame.

In yet another aspect, various embodiments generally relate to a hand-held adhesive device. The device may include: a backing layer and a panel frame for supporting the backing layer. The backing layer has high in-plane stiffness and applied thereto is a layer of an elastic material having an adhering surface for releasably adhering to a target surface. The panel frame includes an arc shaped portion and at least a first flat panel portion extending therefrom. The backing layer may be firmly attached to the panel frame partially at the arc and/or partially on the first flat panel such that the adhesive layer forms a flat surface adapted to adhere to a target surface when the frame is pressed against the target surface from the arc to the flat panel.

In yet another aspect, various embodiments may relate to a kit that includes components suitable for assembling into a hand-held adhesive device for surface holding or weight-bearing.

In some embodiments, the layer of an elastic material may include two, three, four or more separate smaller elastic material layer units or structures.

The backing layer may take any desirable shape including a substantially circular outer boundary, a substantially rectangular outer boundary, a substantially irregular outer boundary, a substantially elliptical outer boundary, for examples. In certain embodiments, the backing layer has a substantially rectangular or square outer boundary and the tether component is attached substantially at the center of the backing layer. In certain embodiments, the backing layer has a substantially circular or oval outer boundary and the tether component is attached substantially at the center of the backing layer. It is noted that the tether component may be attached to the backing layer at any suitable location, for example, away from the center.

The target surface may be any suitable surfaces, including that of glass, metal, wood, plastic, paper, cardboard, or concrete.

The frame of the device may be made of any suitable material, e.g., selected from plastic, fabric, wood and metallic materials.

In certain embodiments, the backing layer is made of a fabric material. In certain embodiments, the tether is a fabric material.

The terms "fabric" or "fabrics", as used herein, refer to a material made through weaving, knitting, braiding, intertwining, interlacing, spreading, bonding, connecting or otherwise linking. A fabric may use naturally occurring or synthetic materials or a blend or hybrid thereof wherein both natural and synthetic materials are present. A fabric may be made from a single, two or multiple components and can be made by one or more of weaving, knitting, braiding, intertwining, interlacing, spreading, bonding, connecting or linking. Exemplary synthetic materials useful for fabrics include polyester, polyolefin, spandex, nylon, carbon fiber, polyaramid, carbon fiber polyaramid hybrid, carbon fiber basalt hybrid, fiberglass, carbon fiber, metal fiber, or fiberglass hybrid. The fabric(s) may include other suitable synthetic materials. Exemplary natural fabrics include cotton, hemp, wool, silk, bamboo string, cellulose, jute, and pina. In certain embodiments, the tether is a non-fabric material, for example, selected from leather, metal sheets, plastic sheets, or non-woven textiles. In some embodiments, the material is made from chain-link meshes.

In certain preferred embodiments, the material of the fabric backing layer comprises one or more materials, such as nylon, carbon fiber, cotton, polyaramid, carbon fiber, polyaramid hybrid, other suitable materials or combinations thereof.

In certain preferred embodiments, the elastic material is a block copolymer elastomer. In certain preferred embodiments, the elastic material comprises one or more of siloxane-based elastomers, urethane-based elastomers, and acrylate-based elastomers.

In some embodiments, the layer of an elastic material comprises two or more separate smaller elastic material layer units.

The adhering surfaces may have any size suitable for the application at hand, for example, having an area from about 0.01 $cm^2$ to about 10,000 $cm^2$ or larger than 10,000 $cm^2$ (e.g., about 0.01 $cm^2$, 0.05 $cm^2$, 0.1 $cm^2$, 0.5 $cm^2$, 1 $cm^2$, 2 $cm^2$, 5 $cm^2$, 10 $cm^2$, 20 $cm^2$, 50 $cm^2$, 100 $cm^2$, 200 $cm^2$, 500 $cm^2$, 1,000 $cm^2$, 3,000 $cm^2$, 5,000 $cm^2$, 10,000 $cm^2$ or greater, from about 0.01 $cm^2$ to about 5,000 $cm^2$, from about 0.01 $cm^2$ to about 3,000 $cm^2$, from about 0.01 $cm^2$ to about 1,000 $cm^2$, from about 0.01 $cm^2$ to about 500 $cm^2$, from about 0.01 $cm^2$ to about 200 $cm^2$, from about 0.01 $cm^2$ to about 100 $cm^2$, from about 0.01 $cm^2$ to about 50 $cm^2$, from about 0.01 $cm^2$ to about 20 $cm^2$, from about 0.01 $cm^2$ to about 10 $cm^2$, from about 0.01 $cm^2$ to about 5 $cm^2$, from about 0.01 $cm^2$ to about 2 $cm^2$, from about 0.01 $cm^2$ to about 1 $cm^2$, from about 0.02 $cm^2$ to about 10,000 $cm^2$, from about 0.1 $cm^2$ to about 10,000 $cm^2$, from about 0.5 $cm^2$ to about 10,000 $cm^2$, from about 1 $cm^2$ to about 10,000 $cm^2$, from about 5 $cm^2$ to about 10,000 $cm^2$, from about 10 $cm^2$ to about 10,000 $cm^2$, from about 50 $cm^2$ to about 10,000 $cm^2$, from about 100 $cm^2$ to about 10,000 $cm^2$, from about 200 $cm^2$ to about 10,000 $cm^2$, from about 500 $cm^2$ to about 10,000 $cm^2$, from about 1,000 $cm^2$ to about 10,000 $cm^2$).

Each adhesive layer may have any thickness suitable for the application at hand, for example, having a substantially uniform thickness from about 0.0001 mm to about 10 cm (e.g., 0.0001 mm, 0.0005 mm, 0.0001 cm, 0.0005 cm, 0.001 cm, 0.005 cm, 0.01 cm, 0.05 cm, 0.1 cm, 0.2, 0.5 cm, 1 cm, 2 cm, 5 cm, 10 cm, from about 0.0001 mm to about 10 cm, from about 0.0001 mm to about 5 cm, from about 0.0001 mm to about 3 cm, from about 0.0001 mm to about 2 cm, from about 0.0001 mm to about 1 cm, from about 0.0001 mm to about 0.5 cm, from about 0.0001 mm to about 0.3 cm, from about 0.0001 mm to about 0.2 cm, from about 0.0001 mm to about 0.1 cm, from about 0.0005 mm to about 10 cm, from about 0.001 mm to about 10 cm, from about 0.01 mm to about 10 cm, from about 0.05 mm to about 10 cm, from about 0.1 mm to about 10 cm, from about 0.5 mm to about 10 cm, from about 1 mm to about 10 cm, from about 5 mm to about 10 cm, from about 1 cm to about 10 cm, from about 2 cm to about 10 cm).

In certain embodiments, the planar layer of the elastic material has a smooth adhering surface area of greater than about 0.01 $cm^2$ and has a substantially uniform thickness of less than about 0.001 cm. In certain embodiments, the planar layer of the elastic material has a smooth adhering surface area of greater than about 0.05 $cm^2$ and has a substantially uniform thickness of less than about 0.005 cm. In certain embodiments, the planar layer of the elastic material has a smooth adhering surface area of greater than about 0.1 $cm^2$ and has a substantially uniform thickness of less than about 0.01 cm. In certain embodiments, the planar layer of the elastic material has a smooth adhering surface area of greater than about 0.2 $cm^2$ and has a substantially uniform thickness of less than about 0.5 cm. In certain embodiments, the planar layer of the elastic material has a smooth adhering surface area of greater than about 0.5 $cm^2$ and has a substantially uniform thickness of less than about 0.2 cm. In certain embodiments, the planar layer of the elastic material has a smooth adhering surface area of greater than about 1.0 $cm^2$ and has a substantially uniform thickness of less than about 0.1 cm. In certain embodiments, the planar layer of the elastic material has a smooth adhering surface area of greater than about 5.0 $cm^2$ and has a substantially uniform thickness of less than about 0.05 cm. In certain embodiments, the planar layer of the elastic material has a smooth adhering surface area of greater than about 10 $cm^2$ and has a substantially uniform thickness of less than about 0.02 cm. In certain embodiments, the planar layer of the elastic material has a smooth adhering surface area of greater than about 100 $cm^2$ and has a substantially uniform thickness of less than about 0.01 cm. In certain embodiments, the planar layer of the elastic material has a smooth adhering surface area from about 10 $cm^2$ to about 100 $cm^2$ and has a substantially uniform thickness from about 0.01 cm to about 0.05 cm. In certain embodiments, the planar layer of the elastic material has a smooth adhering surface area from about 1,000 $cm^2$ to about 100 $cm^2$ and has a substantially uniform thickness from about 0.5 cm to about 0.05 cm.

In certain embodiments, the elastic material has an elastic modulus from about 0.001 MPa to about 100,000 MPa (e.g., 0.001 MPa, 0.01 MPa, 0.05 MPa, 0.1 MPa, 0.5 MPa, 1.0

MPa, 5.0 MPa, 10 MPa, 15 MPa, 20 MPa, 30 MPa, 40 MPa, 50 MPa, 100 MPa, 200 MPa, 500 MPa, 1,000 MPa, 5,000 MPa, 10,000 MPa, 50,000 MPa, 100,000 MPa, from about 0.001 MPa to about 50,000 MPa, from about 0.001 MPa to about 10,000 MPa, from about 0.001 MPa to about 5,000 MPa, from about 0.001 MPa to about 2,000 MPa, from about 0.001 MPa to about 1,000 MPa, from about 0.001 MPa to about 500 MPa, from about 0.001 MPa to about 100 MPa, from about 0.001 MPa to about 50 MPa, from about 0.01 MPa to about 100,000 MPa, from about 0.1 MPa to about 100,000 MPa, from about 0.5 MPa to about 100,000 MPa, from about 1 MPa to about 100,000 MPa, from about 5 MPa to about 100,000 MPa, from about 10 MPa to about 100,000 MPa, from about 50 MPa to about 100,000 MPa, from about 100 MPa to about 100,000 MPa, from about 1,000 MPa to about 100,000 MPa).

In certain preferred embodiments, the elastic material has an elastic modulus from about 0.05 MPa to about 500 MPa. In certain embodiments, the elastic material has an elastic modulus from about 0.05 MPa to about 300 MPa. In certain embodiments, the elastic material has an elastic modulus from about 0.05 MPa to about 100 MPa. In certain embodiments, the elastic material has an elastic modulus from about 0.05 MPa to about 50 MPa. In certain embodiments, the elastic material has an elastic modulus from about 1 MPa to about 500 MPa. In certain embodiments, the elastic material has an elastic modulus from about 1 MPa to about 300 MPa. In certain embodiments, the elastic material has an elastic modulus from about 1 MPa to about 100 MPa.

The term "backing layer", as used herein, refers to a layer of a material such as fabrics, films, foils, sheets, laminates, panels or panes, wherein the layer is used for support or backing. The backing layer may be made of any suitable material including natural or synthetic, metallic or non-metallic, polymeric or non-polymeric materials and may be formed from a single component or a hybrid/blend of two or more components.

The adhering surface can be designed to be capable of bearing a weight of at least 1,200 N per 100 cm² of adhering surface area (e.g., at least 1,500 N per 100 cm² of adhering surface area, at least 2,000 N per 100 cm² of adhering surface area, at least 2,500 N per 100 cm² of adhering surface area, at least 3,000 N per 100 cm² of adhering surface area, at least 3,500 N per 100 cm² of adhering surface area, at least 4,000 N per 100 cm² of adhering surface area, at least 5,000 N per 100 cm² of adhering surface area).

Elastic materials that may be used in the adhesive pads include any suitable elastomers, naturally occurring or synthetic. For example, suitable elastomers include siloxane-based elastomers, urethane-based elastomers, acrylate-based elastomers, ethylene-propylene, polybutadiene, polyisoprene, polychloroprene, ethylene-acrylate, bromoisobutylene-isoprene, chloroisobutylene-isoprene, acrylonitrile-butadiene, styrene-butadiene, styrene-butadiene-styrene, styrene-isoprene-styrene, or styrene-ethylene-butylene-styrene rubbers.

An exemplary siloxane-based elastomer is polydimethylsiloxane (PDMS), which belongs to a group of polymeric organosilicon compounds that are commonly referred to as silicones. PDMS, widely used silicon-based organic polymer, has preferred rheological (or flow) properties. PDMS is generally inert, non-toxic and non-flammable.

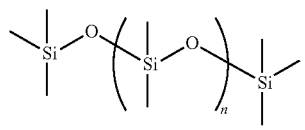

A Polydimethylsiloxane

Other elastic materials that may be used in the adhesive pads include polyurethanes, which are polymers of organic units covalently joined by urethane (carbamate) links

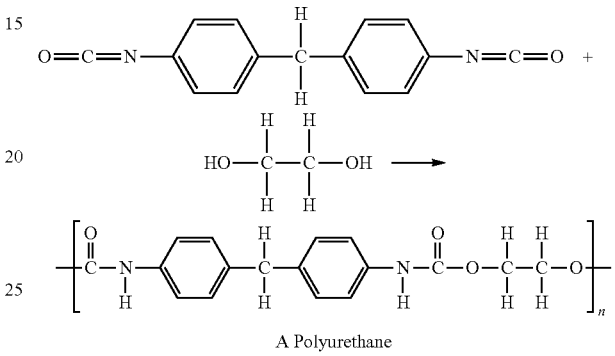

A Polyurethane

A urethane linkage is produced by reacting an isocyanate group, —N=C=O with a hydroxyl group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, R—(N=C=O)$_n$≥2 and a polyol is a molecule with two or more hydroxyl functional groups, R'—(OH)$_n$≥2. The reaction product is a polymer containing the urethane linkage, —RNHCOOR'—. Examples of polyurethane monomers ("pre-polymers") includes hydroxyl ended molecules, such as polyethylene glycol, polypropylene glycol, poly tetramethylene glycol, or bisphenol A (hydroxyl-containing monomers) and an aliphatic or aromatic based isocyanate, such as methylene diphenyl diisocyanate, toluene diphenyl diisocyanate, hexamethylene diisocyanate, isophorone diisocyanate, or a polyisocyanate resulting from the combination of multiple of these monomers (for example, three molecules of methylene diphenyl diisocyanate form a trimer which contains three isocyanate functional groups).

The devices may be designed to be suitable for single, two, multiple, extended and repeated use (e.g., 100 or more repeated closures and releases over an extended period of months or longer). The integrated adhesive pad approach disclosed herein provides a robust platform for a wide-variety of applications. For example, these structures can be used to support shelving for books, displays, and electronic appliances (televisions, computers, stereos, monitors, screens); hanging structures; auto trims; among others.

EXAMPLES

The exemplary device depicted in FIGS. 6A-7E was fabricated by first machining a slit through the grip/frame, which accommodates the tether component. The supported roller was then attached to the frame (e.g., through mechanical, chemical, or other method). The tether of the adhesive was then slid through the slit, at which point the blocker was attached to proximal end of the tether using mechanical, chemical, or other method.

The exemplary device depicted in FIGS. 13A-16D was fabricated by mounting a frame to the proximal end of the tether through mechanical, chemical, or other method, and then the firm material is attached to the frame through mechanical, chemical, or other method.

The exemplary device depicted in FIGS. 17A-19B was fabricated by creating the panel frame through a rapid prototyping machine, attaching threaded rods and to this panel frame, and then clamping the tether to the panel frame through mechanical, chemical, or other method.

Figure 7A:
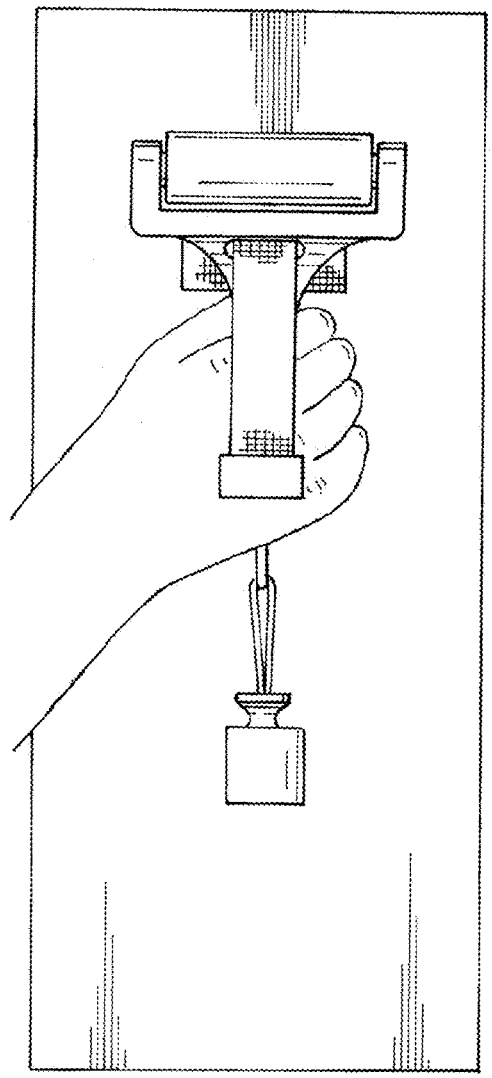
FIG. 7A-E shows an exemplary embodiment of an adhesive device in use.
Figure 7B:
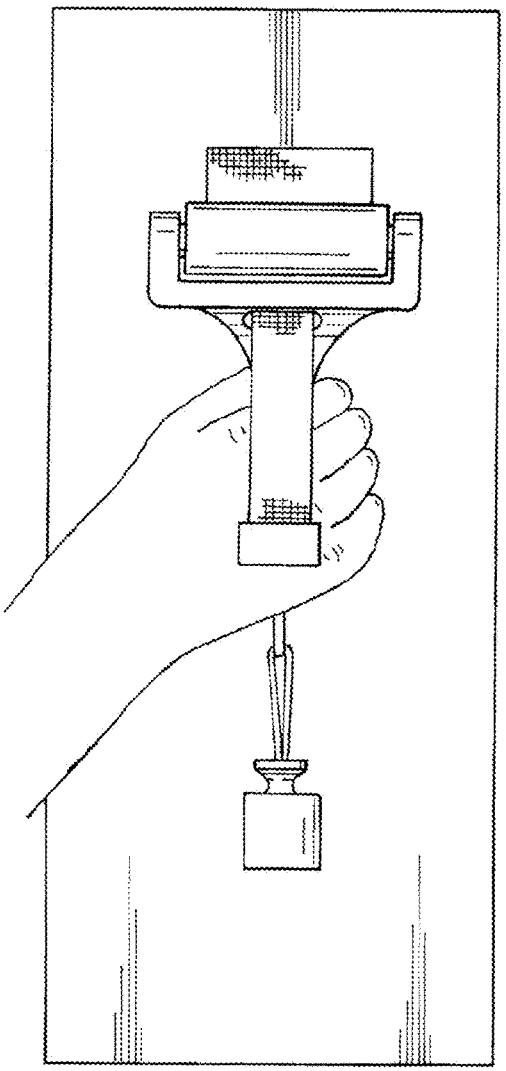
Figure 7C:
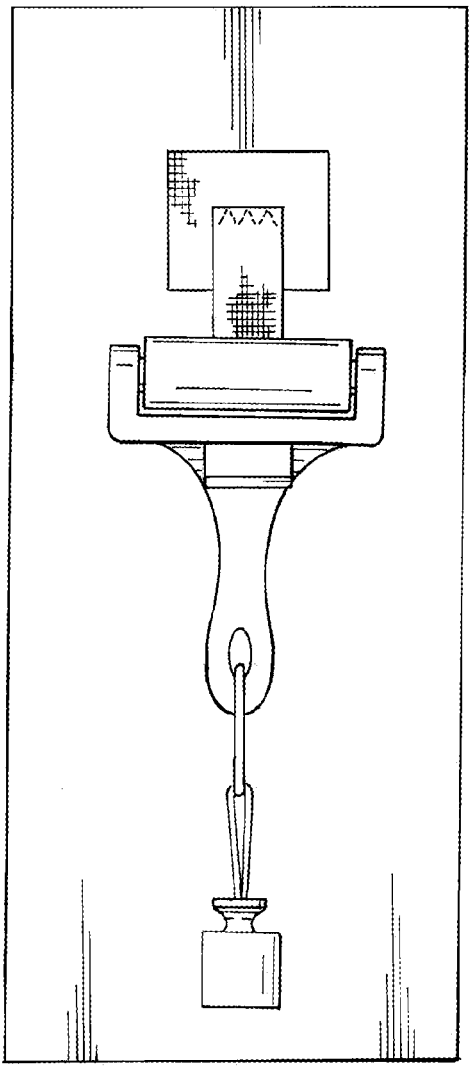
Figure 7D:
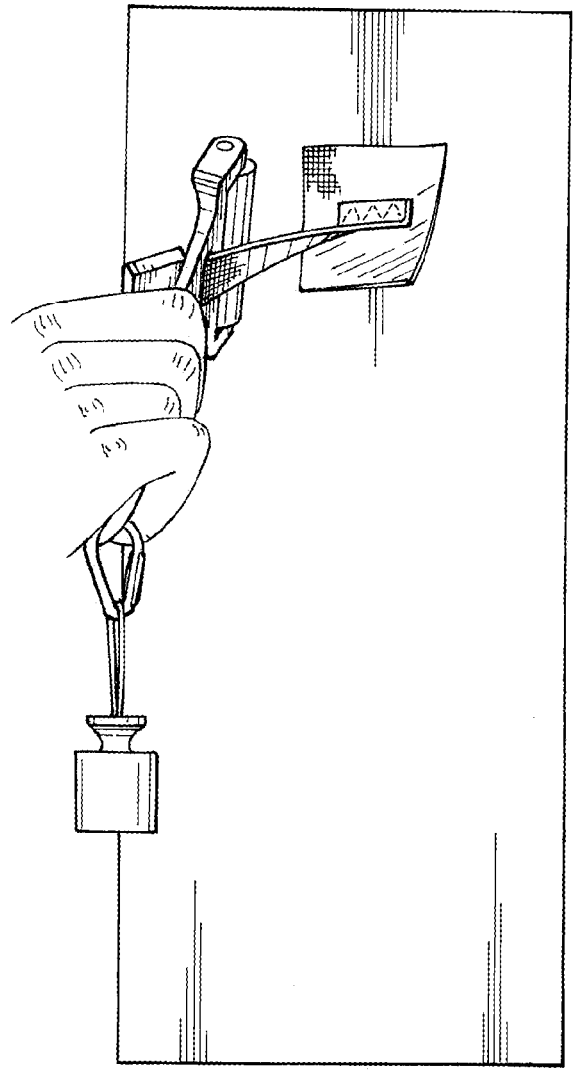
Figure 7E:
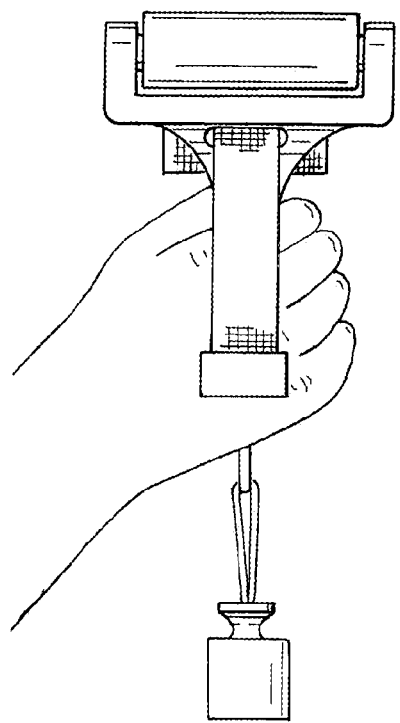

FIG. 7A shows the adhesive device prior to application of the adhesive to the glass target surface. The adhesive is automatically positioned on the leading edge of the foam roller because the weight of the blocker on the end of the tether pulls the adhesive into place. The adhesive is then applied to the surface by pressing the leading edge of the foam roller into the back of the adhesive and then rolling down the length of the adhesive to apply the entire surface of the pad (FIG. 7B). Next, the user lets go of the applicator handle and the adhesive holds the 1 kg weight on the glass surface (FIG. 7C). The adhesive is removed with a gentle tug (FIG. 7D) and the tether slides through the slit and the adhesive rests on the leading edge of the foam roller once again and is ready to be re-applied (FIG. 7E).

In FIGS. 15A-16D, the leading edge of the firm edge was brought into contact with the top of the adhesive pad by bending the tether. The second image demonstrates the application of the adhesive pad by sliding the firm edge down the length of the back of the adhesive pad. A weight was then connected into the rigid mount and the third image shows the adhesive supporting a 1 kg weight. Finally the weight was removed and the adhesive pad is removed with a gentle tug.

The experiment in FIGS. 18A-18D was carried out by bringing a single point or line of the adhesive into contact with the desired substrate. Then the contact area was increased by rolling the arc of the adhesive device over the adhesive, until the entire adhesive patch had been applied to the substrate. The applicator can then be allowed to return to its starting position. The process can occur on the order of seconds or less and can be performed easily, repeatedly, and without any damage to the substrate, adhesive, or applicator device.

Figure 19A:
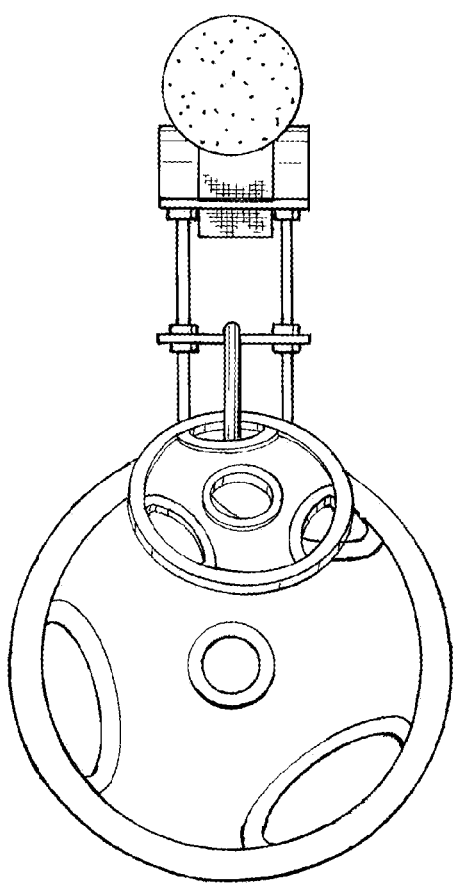
FIG. 19A-B shows an exemplary embodiment of an adhesive device in use.
Figure 19B:
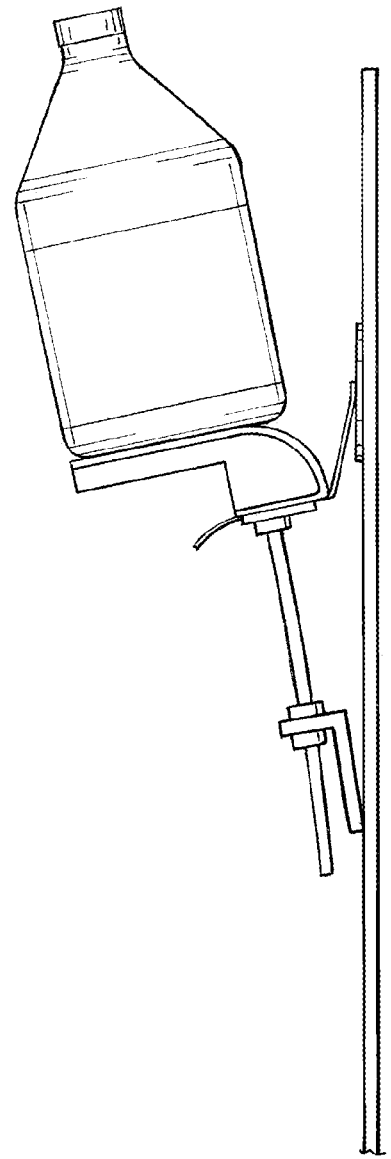

In FIGS. 19A-19B the adhesive device had been applied to a target substrate as in FIGS. 18A-18D, and 50 lbs were hung or a container containing liquid was supported to demonstrate the ability of the device to support a load after application to a target surface.

Elastic modulus referred to herein is the storage modulus values and can be determined, for example, by dynamic mechanical analysis (e.g., where the elastic material is a 40 mm×5 mm×1 mm strip, and tested in extension at a strain of 0.1%, at a frequency of 1 Hz, and at a temperature of 20° C.). This procedure is not meant to be the only procedure for determining elastic modulus.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of embodiments disclosed herein, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the embodiments disclosed herein as the preferred disclosure.

EQUIVALENTS

The representative examples are intended to help illustrate aspects and embodiments of the invention and are not intended to, nor should they be construed to, limit the scope of the present disclosure. Indeed, various modifications of the present disclosure and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of embodiments described herein in its various embodiments and equivalents thereof.

What is claimed is:

1. An adhesive device comprising:
    an adhesive pad including a backing layer and an elastic planar layer having an adhering surface, wherein the elastic planar layer is applied to the backing layer on a side opposite the adhering surface;
    a tether connected to the adhesive pad; and
    a press connected to the tether for pressing the adhesive pad against a target surface.

2. The adhesive device of claim 1, wherein the press is at least one of a roller, a slide, and a compression pad.

3. The adhesive device of claim 1, wherein the backing layer has a higher in-plane stiffness than the elastic planar layer.

4. The adhesive device of claim 1, further comprising a frame connected to the tether, wherein the frame connects the press to the tether.

5. The adhesive device of claim 4, further comprising a connector attached to the frame.

6. The adhesive device of claim 5, wherein the connector is at least one of a handle, a lever, a knob, a switch, a holder, a hook, a clasp, and a clip.

7. The adhesive device of claim 4, wherein the press is formed by at least a portion of the frame.

8. The adhesive device of claim 7, wherein the portion of the frame forming the press is arc shaped.

9. The adhesive device of claim 7, wherein the portion of the frame forming the press is a firm edge of the frame.

10. The adhesive device of claim 7, wherein the tether is slidably attached to the frame.

11. An adhesive device comprising:
- an adhesive pad including a backing layer and an elastic planar layer having an adhering surface, wherein the elastic planar layer is applied to the backing layer on a side opposite the adhering surface;
- a tether connected to the adhesive pad; and
- a frame, wherein a first portion of the frame is connected to the tether.

12. The adhesive device of claim 11, wherein the tether is slidably attached to the frame.

13. The adhesive device of claim 11, further comprising a press connected to the frame, wherein the press is configured to press the adhesive pad against a target surface.

14. The adhesive device of claim 11, wherein the press is at least one of a roller, a slide, and a compression pad.

15. The adhesive device of claim 11, wherein the backing layer has a higher in-plane stiffness than the elastic planar layer.

16. The adhesive device of claim 11, wherein a second portion of the frame is configured to press the adhesive pad against a target surface.

17. The adhesive device of claim 16, wherein the second portion of the frame is arc shaped.

18. The adhesive device of claim 16, wherein the second portion of the frame is a firm edge of the frame.

19. The adhesive device of claim 16, further comprising a connector attached to the frame.

20. The adhesive device of claim 19, wherein the connector is at least one of a handle, a lever, a knob, a switch, a holder, a hook, a clasp, and a clip.

* * * * *